(12) United States Patent
Yasunaga et al.

(10) Patent No.: US 10,466,402 B2
(45) Date of Patent: Nov. 5, 2019

(54) ILLUMINATION DEVICE FOR A DISPLAY DEVICE COMPRISING A LIGHT GUIDE PLATE HAVING AT LEAST ONE OF A THROUGH HOLE AND A CUTOUT

(71) Applicant: Sharp Kabushiki Kaisha, Osaka (JP)

(72) Inventors: Hirotoshi Yasunaga, Osaka (JP); Takeshi Ishida, Osaka (JP); Mitsuhiro Murata, Osaka (JP); Ryuzo Yuki, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 69 days.

(21) Appl. No.: 15/312,312

(22) PCT Filed: May 15, 2015

(86) PCT No.: PCT/JP2015/063999
§ 371 (c)(1),
(2) Date: Nov. 18, 2016

(87) PCT Pub. No.: WO2015/178300
PCT Pub. Date: Nov. 26, 2015

(65) Prior Publication Data
US 2017/0082789 A1    Mar. 23, 2017

(30) Foreign Application Priority Data

May 23, 2014   (JP) ................................. 2014-107351

(51) Int. Cl.
*F21V 8/00*    (2006.01)
*G02B 6/00*    (2006.01)
(Continued)

(52) U.S. Cl.
CPC ............... *G02B 6/002* (2013.01); *G02B 6/00* (2013.01); *G02B 6/0023* (2013.01);
(Continued)

(58) Field of Classification Search
CPC ...... G02B 6/002; G02B 6/0023; G02F 1/1336
See application file for complete search history.

(56) References Cited

U.S. PATENT DOCUMENTS 6,426,807 B1 * 7/2002 Kawai .................. G02B 6/0001
358/484
7,553,061 B2 * 6/2009 Chang .................. G02B 6/0028
349/65
(Continued)

FOREIGN PATENT DOCUMENTS

JP   2002-082625 A   3/2002
JP   2004-241137 A   8/2004
(Continued)

*Primary Examiner* — Paul C Lee
(74) *Attorney, Agent, or Firm* — ScienBiziP, P.C.

(57) ABSTRACT

An illumination device according to the present invention includes: a light source row in which a plurality of light sources are aligned in a row; a light guide plate that includes a plate-shaped main body with an end thereof facing the light source row, a light-receiving portion that is arranged on the end of the main body and into which light from the light sources enters, plate-shaped side extensions that are arranged on the sides of the main body and that extend outwards further than the light-receiving portion, and a light-exiting portion that is arranged on front surfaces of the main body and the side extensions and that allows light that enters via the light-receiving portion to exit; and a supply unit that supplies light to the side extensions.

3 Claims, 23 Drawing Sheets

(51) Int. Cl.
*G02F 1/13357* (2006.01)
*G02F 1/1335* (2006.01)

(52) U.S. Cl.
CPC ......... *G02B 6/0038* (2013.01); *G02B 6/0068* (2013.01); *G02F 1/1336* (2013.01); *G02F 1/133524* (2013.01); *G02F 1/133603* (2013.01)

(56) References Cited

U.S. PATENT DOCUMENTS

| | | | | |
|---|---|---|---|---|
| 2002/0141174 | A1* | 10/2002 | Parker | A61M 21/02 362/612 |
| 2007/0177405 | A1* | 8/2007 | Chan | G02B 6/002 362/613 |
| 2008/0198621 | A1* | 8/2008 | Tanoue | G02B 6/0021 362/606 |
| 2009/0027588 | A1* | 1/2009 | Medendorp, Jr. | G02B 6/0076 349/62 |
| 2009/0196071 | A1* | 8/2009 | Matheson | G02B 6/0021 362/623 |
| 2011/0222000 | A1* | 9/2011 | Yabe | G02B 6/0016 349/62 |
| 2011/0255835 | A1* | 10/2011 | Yagi | G02B 6/0011 385/129 |
| 2012/0044438 | A1* | 2/2012 | Cao | G02B 6/0073 349/61 |
| 2012/0300494 | A1* | 11/2012 | Watabe | G02B 26/02 362/602 |
| 2013/0039093 | A1* | 2/2013 | Song | G02B 6/002 362/613 |
| 2013/0121020 | A1* | 5/2013 | Liu | G02B 6/0021 362/606 |
| 2013/0235613 | A1* | 9/2013 | Cheong | G02B 6/0038 362/602 |

FOREIGN PATENT DOCUMENTS

| | | |
|---|---|---|
| JP | 2008-203483 A | 9/2008 |
| JP | 2009-117272 A | 5/2009 |
| JP | 2011-192490 A | 9/2011 |

* cited by examiner

ILLUMINATION DEVICE FOR A DISPLAY DEVICE COMPRISING A LIGHT GUIDE PLATE HAVING AT LEAST ONE OF A THROUGH HOLE AND A CUTOUT

TECHNICAL FIELD

The present invention relates to an illumination device and a display device.

BACKGROUND ART

Liquid crystal panels are used in display devices in televisions, mobile phones such as smartphones, mobile computing devices, and the like. To display images, liquid crystal panels need to use external light. Therefore, as described in Patent Document 1, display devices of this type include a liquid crystal panel as well as an illumination device (a so-called backlight device) for supplying light to the liquid crystal panel. This illumination device is arranged on the rear surface side of the liquid crystal panel and is configured to emit light that is spread out in a planar manner towards the rear surface of the liquid crystal panel.

As described in Patent Document 1, one well-known example of such an illumination device is the so-called edge-lit (or side-lit) type, which includes a light guide plate constituted by a transparent rectangular plate-shaped member and a light source unit arranged facing an end face of the light guide plate. The end face of the light guide plate functions as a light-receiving portion into which light emitted from the light source unit enters, and the front surface of the light guide plate functions as a light-exiting portion which allows the light that entered via the light-receiving portion to exit.

In recent years, configurations (hereinafter, "LED units") in which a plurality of light-emitting diodes (LEDs) are mounted on an elongated LED substrate have been widely used as light source units in this type of illumination device.

Moreover, due to design diversification and the like, in recent years there has been demand for display devices having display surfaces of various shapes other than just rectangular shapes. Therefore, there has also been demand for illumination devices of various shapes as well.

RELATED ART DOCUMENT

Patent Document

Patent Document 1: Japanese Patent Application Laid-Open Publication No. 2009-117272

Problems to be Solved by the Invention

For example, some applications require an illumination device that includes a light guide plate that has a shape (such as an inverted trapezoidal shape, for example) in which the length (width) of a portion on the far side end of the light guide plate is greater than the length (width) of the end face that functions as the light-receiving portion.

In this case, portions that do not face the light-receiving portion and that extend outwards further than the light-receiving portion are formed on the sides of the light guide plate, and light from the LED unit is not directly supplied to these portions. As a result, illumination devices that include such a light guide tend to emit light with irregularities in brightness.

SUMMARY OF THE INVENTION

The present invention aims to prevent irregularities in brightness in the light emitted from the light-exiting portion in an illumination device or the like that includes a light guide plate in which the width of the far side portion is greater than the width of the light-receiving portion.

Means for Solving the Problems

An illumination device according to the present invention includes: a light source row in which a plurality of light sources are aligned in a row; a light guide plate that includes a plate-shaped main body with an end thereof facing the light source row, a light-receiving portion that is arranged on the end of the main body and into which light from the light sources enters, a plate-shaped side extension that is arranged on a side of the main body and that extends outwards further than the light-receiving portion, and a light-exiting portion that is arranged on front surfaces of the main body and the side extension and that allows light that enters via the light-receiving portion to exit; and a supply unit that supplies light to the side extension. Including the supply unit in the illumination device makes it possible to supply light to the side extension, thereby making it possible to prevent irregularities in brightness in the light that exits from the light-exiting portion.

In the illumination device, the light-receiving portion may include a main body light-receiving portion that allows light to enter the main body and a side light-receiving portion that is arranged further outwards than the main body light-receiving portion and that allows light to enter the side extension, the light source row may include a center light source that is arranged towards a center side of the plurality of light sources such that an optical axis of that center light source is positioned within the main body and a side light source that is arranged on an outer side of the center light source such that an optical axis of that side light source is positioned within the side extension, and the supply unit may be constituted by the side light-receiving portion and the side light source. Including the supply unit that is constituted by the side light-receiving portion and the side light source in the illumination device makes it possible to supply light to the side extension, thereby making it possible to prevent irregularities in brightness in the light that exits from the light-exiting portion.

In the illumination device, the light-receiving portion may be constituted by a portion of the end of the main body that is recessed in a concave shape. Configuring the light-receiving portion in this way makes it easier to form the side light-receiving portion as the supply unit.

The illumination device may further include: a secondary light source; wherein the light guide plate includes two of the side extensions that are respectively arranged on both outer sides of the main body, wherein the secondary light source is arranged facing an outer end of one of the side extensions and supplies light that crosses through the main body towards an other of the side extensions, and wherein the supply unit is constituted by the secondary light source. Including the supply unit that is constituted by the secondary light source in the illumination device makes it possible to supply light to the side extension, thereby making it possible to prevent irregularities in brightness in the light that exits from the light-exiting portion.

In the illumination device, the light source row may include a side light source that supplies light to the side extension and that is one of the plurality of light sources, the light-receiving portion may have a protrusion shape protruding out from the end of the main body towards the side light source and may include a side light-receiving portion into which light from the side light source enters, the side light-receiving portion may face the side light source and may include a light-receiving end face into which the light from the side light source enters as well as a reflective wall that is constituted by a portion of a peripheral wall surrounding the light-receiving end face and that reflects or scatters light that enters via the light-receiving end face in order to supply that light towards the side extension, and the supply unit may be constituted by the reflective wall. Including the supply unit that is constituted by the reflective wall in the illumination device makes it possible to supply light to the side extension, thereby making it possible to prevent irregularities in brightness in the light that exits from the light-exiting portion.

In the illumination device, the light guide plate may further include a reflection/scattering portion that is arranged on an end opposite to the light-receiving portion and that reflects or scatters light from the light sources towards the side extension, and the supply unit may be constituted by the reflection/scattering portion. Including the supply unit that is constituted by the reflection/scattering portion in the illumination device makes it possible to supply light to the side extension, thereby making it possible to prevent irregularities in brightness in the light that exits from the light-exiting portion.

In the illumination device, the reflection/scattering portion may be formed directly on the end of the light guide plate.

In the illumination device, the reflection/scattering portion may be formed on a surface of member arranged on an outer side of the end of the light guide plate.

Furthermore, a display device according to the present invention includes the illumination device and a display panel that displays images using light from the illumination device. In the display device, the display panel may be a liquid crystal panel in which a liquid crystal material is sealed between a pair of substrates.

Effects of the Invention

The present invention makes it possible to prevent irregularities in brightness in the light emitted from the light-exiting portion in an illumination device or the like that includes a light guide plate in which the width of the far side portion is greater than the width of the light-receiving portion.

DETAILED DESCRIPTION OF EMBODIMENTS

Embodiment 1

Next, Embodiment 1 of the present invention will be described with reference to FIGS. 1 to 3. The present embodiment is an example of an illumination device 14 and a liquid crystal display device 10 that includes the illumination device 14. Note that the X, Y, and Z axes are labeled in each figure. Moreover, the illumination device 14 and the like will be described using a directional convention in which the upper side as illustrated in FIG. 2 is the "front side" and the lower side in FIG. 2 is the "rear side."

Figure 1:
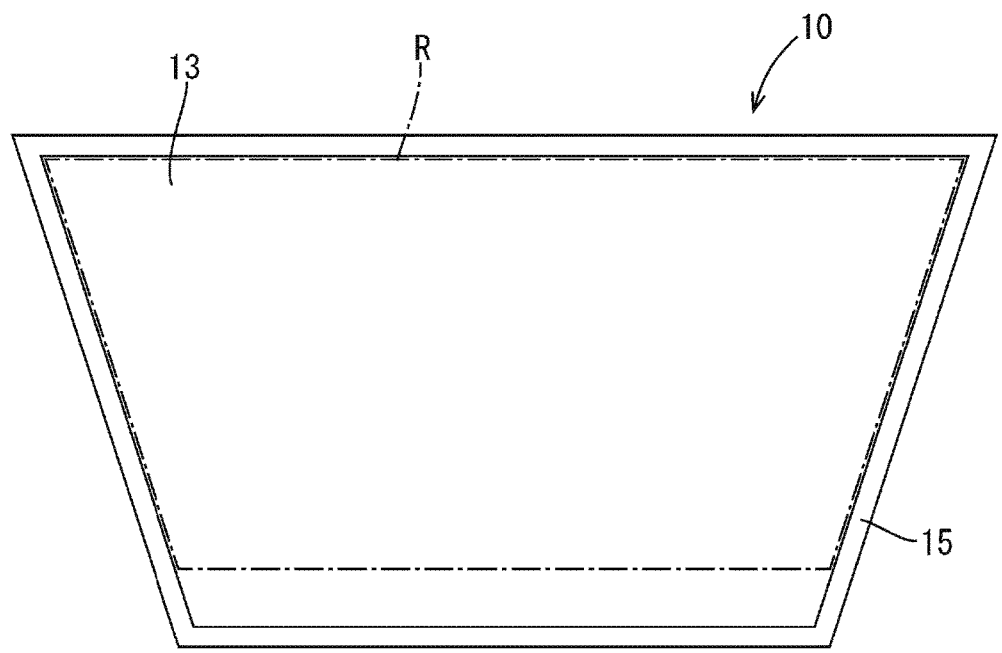
FIG. 1 is a plan view schematically illustrating a liquid crystal display device according to Embodiment 1.
Figure 1:
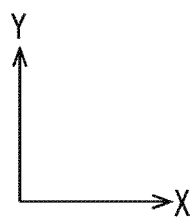
Figure 2:
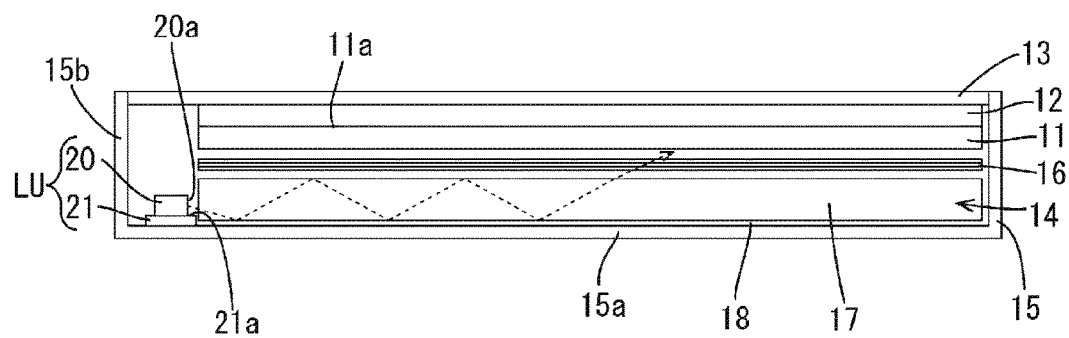
FIG. 2 is a cross-sectional view taken along the short direction of the liquid crystal display device.
Figure 2:
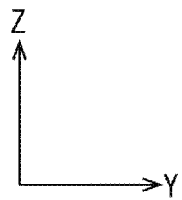

FIG. 1 is a plan view schematically illustrating the liquid crystal display device 10 according to Embodiment 1, and FIG. 2 is a cross-sectional view taken along the short direction of the liquid crystal display device 10. As illustrated in FIG. 1, the liquid crystal display device 10 has an inverted trapezoidal shape overall when viewed in a plan view from the front side. The liquid crystal display device 10 primarily includes a liquid crystal panel (display panel) 11 that displays images, a touch panel 12 for inputting positional information within the plane of a display surface 11a of the liquid crystal panel 11, a transparent cover panel 13 that protects the touch panel 12 and the like, and an illumination device (backlight device) 14 which is an external light source that supplies light to the liquid crystal panel 11.

The touch panel 12 is a projected-capacitive touch panel, for example, and is layered onto the front side (the display surface 11a side) of the liquid crystal panel 11 via an adhesive layer (not illustrated in the figures). Furthermore, the cover panel 13 is a plate-shaped piece of tempered glass or the like and is layered onto the front side of the touch panel 12 via an adhesive layer (not illustrated in the figures). The liquid crystal panel 11, the touch panel 12, and the cover panel 13 each have an inverted trapezoidal shape and are integrated together in a layered manner.

The liquid crystal panel 11 includes a pair of substantially transparent glass substrates that have an inverted trapezoidal shape when viewed in a plan view and that are fixed together with a prescribed space (cell gap) therebetween, as well as a liquid crystal material that is sealed between the substrates. The substrate of the pair of substrates that is arranged on the rear side is an array substrate, which includes mutually orthogonal source lines and gate lines, switching elements (TFTs, for example) that are connected to the source lines and the gate lines, pixel electrodes that are connected to the switching elements, an alignment film, and the like. Meanwhile, the substrate that is arranged on the front side is a color filter (CF) substrate, which includes a color filter in which colored members of colors such as red (R), green (G), and blue (B) are arranged in a prescribed pattern, an opposite electrode, an alignment film, and the like. Moreover, a polarizer is fixed to the outer side of each substrate.

Furthermore, the liquid crystal panel 11 is driven using an active matrix scheme and uses light supplied from the illumination device 14 to display images on the display surface 11a. FIG. 1 illustrates the region (a display region R) of the display surface 11a of the liquid crystal panel 11 that is visible when viewed through the cover panel 13. The illumination device 14 emits planar light towards this region (the display region R) of the liquid crystal panel 11 from the rear surface side (rear side) thereof.

The illumination device 14 is a so-called edge-lit (or side-lit) device and primarily includes a housing 15, an optical sheet 16, an LED unit LU, a light guide plate 17, a reflective sheet 18, and the like. FIG. 3 is a plan view of the illumination device 14. Moreover, FIG. 4 illustrates the illumination device 14 in a state in which components such as the optical sheet 16 have been removed.

The housing 15 is made of a synthetic resin, for example, and an opening is formed in the upper side to form a shallow box shape. The housing 15 includes a bottom portion 15a that has an inverted trapezoidal shape when viewed in a plan view from the front side and a peripheral wall portion 15b that rises up from the periphery of the bottom portion 15a. The optical sheet 18, the light guide plate 17, and the optical sheet 16 are layered together in that order and housed inside of the housing 15. Furthermore, components such as the liquid crystal panel 11, the touch panel 12, and the cover panel 13 are also housed inside of the housing 15 in addition to the components of the illumination device 14. The cover panel 13 is arranged closing up the opening in the housing 15.

Similar to the light guide plate 17 and other components, the optical sheet 16 has an inverted trapezoidal shape when viewed in a plan view from the front side. The optical sheet 16 is a layered sheet that includes a diffusion sheet, a lens sheet, and a reflective polarizing sheet. The optical sheet 16 is arranged on the front surface of the light guide plate 17, thereby covering the light guide plate 17. The size of the optical sheet 16 is set to be substantially equal to the size of the surface of the light guide plate 17. It should also be noted that the configuration of the optical sheet 16 is not limited to the layered configuration described above.

The LED unit LU primarily includes a plurality of LEDs (light sources) 20 and an LED substrate 21. The LED unit LU has an elongated overall shape and is arranged running along one of the end faces of the light guide plate 17.

The LEDs 20 are so-called LED packages having a structure in which a resin material is used to seal LED chips into substrate-shaped portions that are then fixed to the LED substrate 21. The LED chips packaged in the substrate portions have a single primary emission wavelength. More specifically, LED chips that emit a single color of blue light are used. A phosphor that emits light of a prescribed color when excited by the blue light emitted from the LED chips is dispersed in the resin material used to seal the LED chips. The resin material is prepared such that primarily white light is emitted overall. Moreover, an appropriate combination of any of a yellow phosphor that emits yellow light, a green phosphor that emits green light, and a red phosphor that emits red light or any single one of these phosphors, for example, may be used for the overall phosphor. The LEDs 20 are so-called side-emitting LEDs in which the faces thereof that are orthogonal to the mounting faces attached to the LED substrate 21 are the primary light-emitting faces.

Furthermore, the LEDs 20 emit, from the primary light-emitting faces thereof, light having prescribed spreading (directional) properties and centered about respective optical axes L. In the present embodiment, the optical axes L of the emitted light are orthogonal to the centers of the respective primary light-emitting faces.

The LED substrate 21 is plate-shaped overall. The LED substrate 21 is placed on the bottom portion 15a and arranged between the light guide plate 17 and the peripheral wall portion 15b such that the LEDs 20 face the end face of the light guide plate 17. The LED substrate 21 is fixed to the bottom portion 15a of the housing 15 or the like using a fixing unit (such as an adhesive or screw; not illustrated in the figure).

The LED substrate 21 primarily includes an elongated base material made of a metal material such as an aluminum material, an insulating layer formed on the base material and made of a synthetic resin, a wiring pattern formed on the insulating layer and made of a metal film such as copper foil, and a reflective layer (reflective film) formed covering the wiring pattern on the insulating layer and made of a white insulating film. Note that to simplify the description, the base material, insulating layer, wiring pattern, and reflective layer of the LED substrate 21 are depicted as a single integrated unit in the figures.

The plurality of LEDs 20 are surface-mounted on the front surface (mounting surface) 21a of the LED substrate 21. The LEDs 20 are arranged on the surface 21a in a row that runs in the lengthwise direction of the LED substrate 21, thereby forming an LED row (light source row) 22. The LEDs 20 each have the same exterior shape (a rectangular prism shape). Moreover, the LEDs 20 are connected to one another in series via the wiring pattern formed on the LED substrate 21.

Similar to components such as the bottom portion 15*a* of the housing 15, the reflective sheet 18 has an inverted trapezoidal shape when viewed in a plan view from the front side. In the present embodiment, the reflective sheet 18 is made of a white foamed plastic sheet (such as a foamed polyethylene terephthalate sheet). The reflective sheet 18 is housed within the housing 15 and is placed on the bottom portion 15*a* so as to cover the rear side of the light guide plate 17. In other words, the reflective sheet 18 is sandwiched between the light guide plate 17 and the bottom portion 15*a*.

Figure 3:
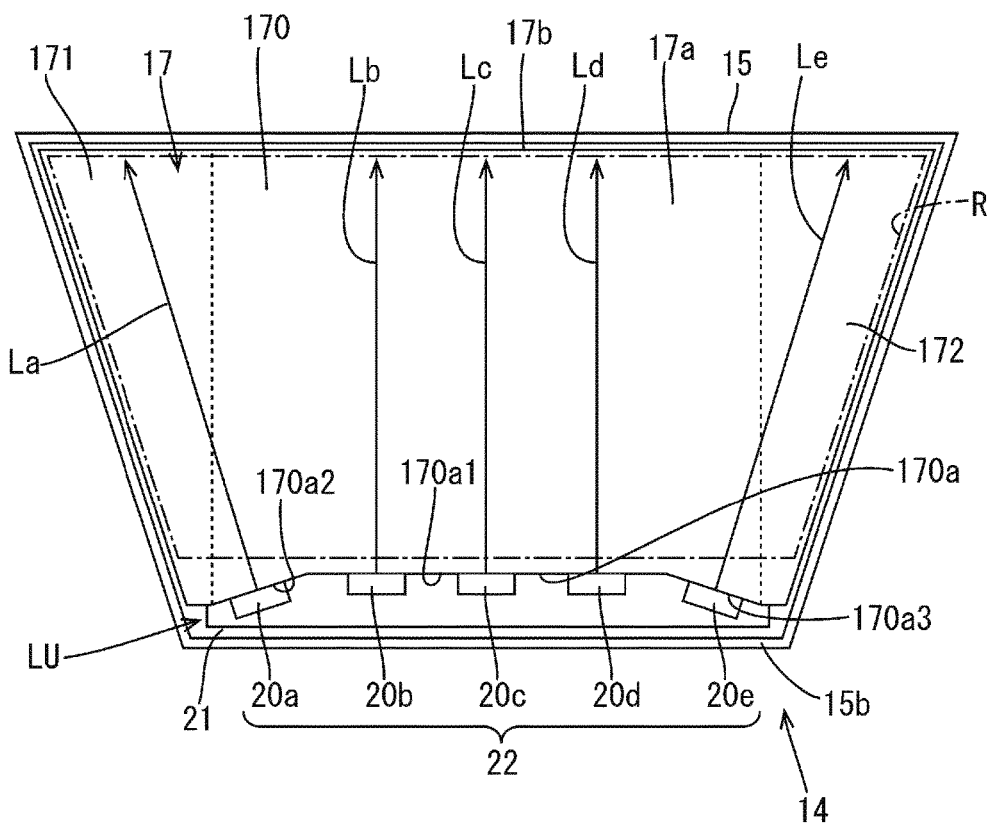
FIG. 3 is a plan view of an illumination device.
Figure 4:
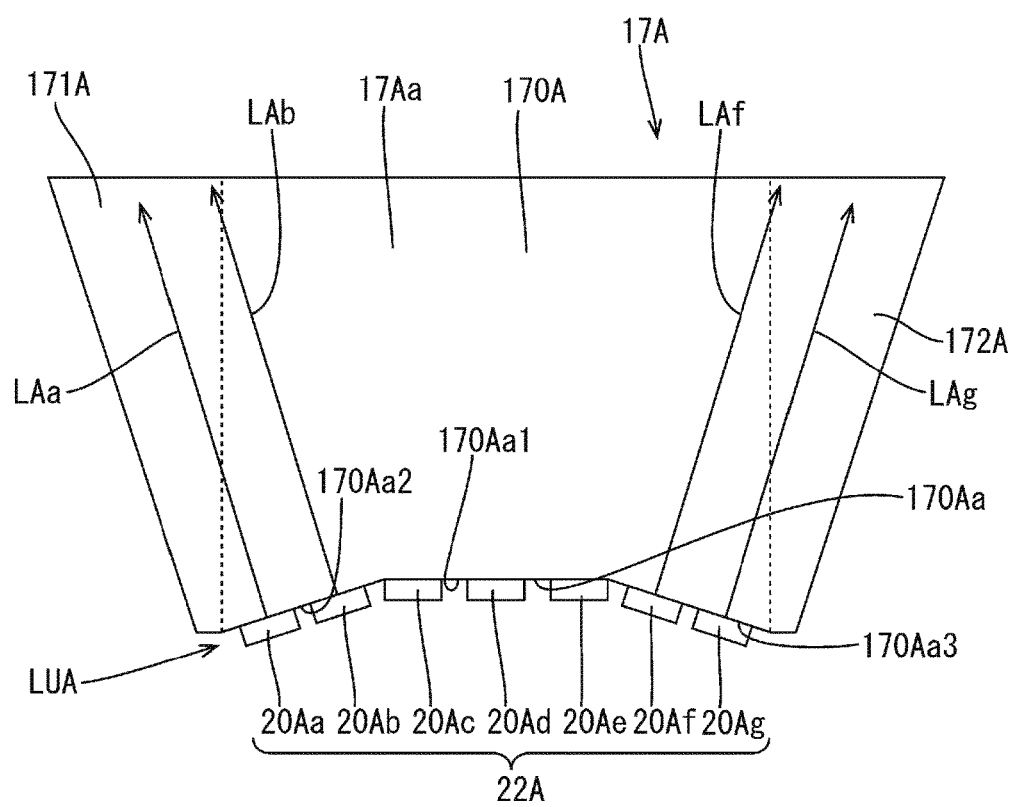
FIG. 4 is a plan view schematically illustrating a light guide plate and a row of LEDs used in an illumination device according to Embodiment 2.

As illustrated in FIG. 3, the light guide plate 17 has an inverted trapezoidal shape overall in which the bottom side is shorter than the top side (similar to the liquid crystal panel 11 and other components) and is constituted by a transparent plate-shaped member of a prescribed thickness. The light guide plate 17 is made of a transparent synthetic resin material that has a higher refractive index than air (such as a polycarbonate resin or an acrylic resin such as polymethyl methacrylate (PMMA)). Moreover, the light guide plate 17 has a plate shape of a greater thickness than the optical sheet 16.

Furthermore, the light guide plate 17 is fixed in place within the housing 15 by locking pins (not illustrated in the figure) that protrude up from the bottom portion 15*a* of the housing 15 and are inserted into holes (not illustrated in the figure) formed in the rear side of the light guide plate 17, for example.

The rear surface of the light guide plate 17 is patterned to have a prescribed in-plane distribution of spot-shaped reflection/scattering portions (not illustrated in the figure) that reflect or scatter light within the light guide plate 17. The reflection/scattering portions are formed using a process such as silk screen printing or embossing.

The light guide plate 17 is divided into a plate-shaped main body 170 that faces the LED row (light source row) 22 and plate-shaped side extensions 171 and 172 that respectively extend along the sides of the main body 170.

The main body 170 has an approximately rectangular shape when viewed in a plan view and includes an end 170*a* that faces the LED row 22. The end 170*a* functions as a light-receiving portion 170*a* through which light emitted from the LEDs 20 (20*a*, 20*b*, 20*c*, 20*d*, 20*e*) enters the light guide plate 17. Furthermore, the side extensions 171 and 172 extend along the sides of the main body 170 and extend outwards farther than the light-receiving portion 170*a*.

The side extensions 171 and 172 are quadrilaterals that have an approximately triangular shape overall when viewed in a plan view and gradually extend further outwards (in the left and right directions in FIG. 3) going from the light-receiving portion 170*a* side towards the opposite side. The side extensions 171 and 172 are integrated together with the main body 170. Moreover, the side extension 171 is arranged on the left side in FIG. 3 while the side extension 172 is arranged on the right side, such that the side extensions 171 and 172 exhibit left-right symmetry. Furthermore, as illustrated in FIG. 3, the ends of the side extension 171, the main body 170, and the side extension 172 form an end 17*b* of the light guide plate 17 which is opposite to the light-receiving portion 170*a*.

In the light guide plate 17, the width (that is, the width in the X axis direction) of the light-receiving portion 170*a* is less than the width (in the X axis direction) of the far side of the light guide plate 17. Note that for convenience, in the present specification, the light-receiving portion 170*a* side of the light guide plate 17 will be referred to as the "near side" and the opposite side will be referred to as the "far side." Moreover, widths in the left-to-right direction of the light guide plate 17 will be referred to simply as "width," as above.

The light-receiving portion 170*a* includes a main body light-receiving portion 170*a*1 that allows light to enter the main body 170 and side light-receiving portions 170*a*2 and 170*a*3 that are arranged further outwards than the main body light-receiving portion 170*a*1 and allow light to enter the side extensions 171 and 172.

The main body light-receiving portion 170*a*1 is constituted by a flat band-shaped end (end face) of the main body 170 that extends in the left-to-right direction. The side light-receiving portion 170*a*2 on one side allows light to enter the left side extension 171 and is constituted by a flat end (end face) of the main body 170 that is adjacent to the main body light-receiving portion 170*a*1. However, the side light-receiving portion 170*a*2 is angled relative to the main body light-receiving portion 170*a*1 so as to face the left side extension 171. Meanwhile, the side light-receiving portion 170*a*3 on the other side allows light to enter the right side extension 172 and is constituted by a flat end (end face) of the main body 170 that is adjacent to the main body light-receiving portion 170*a*1. However, the side light-receiving portion 170*a*3 is angled relative to the main body light-receiving portion 170*a*1 so as to face the right side extension 172.

The light-receiving portion 170*a* as formed by the main body light-receiving portion 170*a*1 arranged in the center and the adjacently arranged side light-receiving portions 170*a*2 and 170*a*3 that sandwich the main body light-receiving portion therefore has an overall concave shape in which the end of the main body 170 recedes towards the far side.

For convenience, the following description assumes that the LED row 22 that faces the light-receiving portion 170*a* includes five of the LEDs 20 (20*a*, 20*b*, 20*c*, 20*d*, 20*e*). The LEDs 20 are arranged in a row going from the left side to the right side in FIG. 3 in the following order: LED 20*a*, LED 20*b*, LED 20*c*, LED 20*d*, LED 20*e*.

The five LEDs 20 are divided into center LEDs (center light sources) that are arranged in the center such that the optical axes L thereof are positioned within the main body 170 and side LEDs (side light sources) that are arranged on the outer sides of the center light sources such that the optical axes L thereof are positioned within the side extensions 171 and 172.

In the present embodiment, the center LEDs (center light sources) correspond to the three LEDs 20 that are arranged in the center of the LED row 22 (that is, the LED 20*b*, the LED 20*c*, and the LED 20*d*) such that the optical axes Lb, Lc, and Ld thereof are positioned solely within the main body 170.

Meanwhile, the LED 20*a* corresponds to a side LED (side light source) and is arranged on the left side of the LED row 22 such that the optical axis La thereof is positioned within the left side extension 171. Similarly, the LED 20*e* corresponds to a side LED (side light source) and is arranged on the right side of the LED row 22 such that the optical axis Le thereof is positioned within the right side extension 172. Moreover, the optical axis La of the LED 20*a* is arranged going from the side light-receiving portion 170*a*2 into the main body 170 and then into the side extension 171. Similarly, the optical axis Le of the LED 20*e* is arranged going from the side light-receiving portion 170*a*3 into the main body 170 and then into the side extension 171. In other words, the optical axes L of the side LEDs (side light sources) are arranged going from the side light-receiving portions 170a2 and 170a3 into the main body 170 and then continuing into at least the side extensions 171 and 172.

Furthermore, although in reality a prescribed clearance is maintained between the LEDs 20 and the light-receiving portion 170a, in the figures the LEDs 20 and the light-receiving portion 170a are depicted as contacting one another in order to simplify the description.

The LED 20a is angled facing outwards (towards the left side) in order to be able to emit light towards the left side extension 171. Similarly, the LED 20e is angled facing outwards (towards the right side) in order to be able to emit light towards the right side extension 172.

The front surface 17a of the light guide plate 17 functions as a light-exiting portion 17a that allows the light that entered through the light-receiving portion 170a to exit towards the liquid crystal panel 11 side. The light-exiting portion 17a includes the front surface of the main body 170, the front surface of the left side extension 171, and the front surface of the right side extension 172. Note that in FIG. 3, the surface 17a of the light guide plate 17 is depicted as the portion corresponding to the display region R. The light guide plate 17 is configured to be able to uniformly emit light at least from the portion thereof that corresponds to this display region R.

It should also be noted that the illumination device 14 may include well-known components other than those described above (such as a frame) as appropriate.

The liquid crystal display device 10 turns on the LEDs 20 of the LED unit LU of the illumination device 14 when displaying images on the display surface 11a of the liquid crystal panel 11. Once the LEDs 20 (the LEDs 20a, 20b, 20c, 20d, and 20e) are turned on, the light from those LEDs 20 enters the light guide plate 17 via the light-receiving portion 170a on the near end of the light guide plate 17.

The light that enters then undergoes reflection and the like due to components such as the reflective sheet 18 covering the rear side of the light guide plate 17 and the reflection/scattering portions (not illustrated in the figure) formed on the rear surface of the light guide plate 17, and this light continues to propagate throughout the light guide plate 17 and then exits from the light-exiting portion 17a constituted by the front surface thereof.

Furthermore, the light from the LED 20a enters the light guide plate 17 primarily via the side light-receiving portion 170a2 and proceeds towards the left side extension 171 while repeatedly undergoing reflection and the like within the light guide plate 17. Similarly, the light from the LED 20e enters the light guide plate 17 primarily via the side light-receiving portion 170a3 and proceeds towards the right side extension 172 while repeatedly undergoing reflection and the like within the light guide plate 17. Meanwhile, the light from the LEDs 20b, 20c, and 20d enters the light guide plate 17 primarily via the main body light-receiving portion 170a and proceeds throughout the main body 170 while repeatedly undergoing reflection and the like.

The light that exits from the light-exiting portion 17a of the light guide plate 17 then passes through the optical sheet 16 and becomes planar light that illuminates the liquid crystal panel 11 from the rear side thereof. The liquid crystal panel 11 uses the light from the illumination device 14 to display images on the display surface 11a.

In the illumination device 14 according to the present embodiment, the side LEDs (side light sources) 20a and 20e and the side light-receiving portions 170a2 and 170a3 of the light guide plate 17 function together as a supply unit that supplies light to the side extensions 171 and 172. Including such a supply unit makes it possible to also supply light to the side extensions 171 and 172 of the light guide plate 17, thereby preventing the light that exits from the side extensions 171 and 172 from being relatively darker than the light that exits from the main body 170. Therefore, the illumination device 14 according to the present embodiment makes it possible to prevent irregularities in brightness in the light emitted from the light-exiting portion 17a of the light guide plate 17.

Embodiment 2

Next, Embodiment 2 of the present invention will be described with reference to FIG. 4. In the present embodiment, a light guide plate 17A and an LED row (light source row) 22A used in an illumination device will be described. FIG. 4 is a plan view schematically illustrating the light guide plate 17A and the LED row 22A used in the illumination device according to Embodiment 2.

Similar to in Embodiment 1, the light guide plate 17A has an inverted trapezoidal shape overall when viewed in a plan view and includes a substantially rectangular main body 170A, a side extension 171A that is shown on the left side of FIG. 4, and a side extension 172A that is shown on the right side of FIG. 4. The near side (LED unit LUA side) end 170Aa of the main body 170A has an overall concave shape that recedes towards the far side.

The near end 170Aa of the main body 170A functions as a light-receiving portion 170Aa into which light from LEDs 20A (20Aa, 20Ab, 20Ac, 20Ad, 20Ae, 20Af, and 20Ag) in the LED row 22A enters. Moreover, in comparison to Embodiment 1, the LED row 22A includes more of the LEDs 20A, and the gaps between the adjacent LEDs 20A are smaller.

The light-receiving portion 170Aa includes a main body light-receiving portion 170Aa1 that allows light to enter the main body 170A, a side light-receiving portion 170Aa2 that allows light to enter the left side extension 171A, and a side light-receiving portion 170Aa3 that allows light to enter the right side extension 172A.

In the present embodiment, the length of the side light-receiving portions 170Aa2 and 170Aa3 relative to the main body light-receiving portion 170Aa1 is set to be greater than in Embodiment 1. Furthermore, the two LEDs 20Aa and 20Ab are arranged facing the side light-receiving portion 170Aa2 as side LEDs (side light sources), and similarly, the two LEDs 20Af and 20Ag are arranged facing the side light-receiving portion 170Aa3 as side LEDs (side light sources).

In this way, the optical axes LAa and LAb of the two LEDs 20Aa and 20Ab are positioned within the left side extension 171A, and the optical axes LAf and LAg of the two LEDs 20Af and 20Ag are positioned within the right side extension 172A. Moreover, the three LEDs 20A (20Ac, 20Ad, and 20Ae) arranged in the center of the LED row 22A function as center LEDs (center light sources), which are arranged such that the optical axes thereof are positioned within the main body 170A.

As described in the present embodiment, a plurality of (here, two) LEDs may be assigned to face the side light-receiving portions 170Aa2 and 170Aa3.

In the illumination device according to the present embodiment, the side light-receiving portions 170Aa2 and 170Aa3 of the light guide plate 17A and the LEDs 20Aa, 20Ab, 20Af, and 20Ag that serve as the side LEDs (side light sources) function together as a supply unit that supplies light to the side extensions 171A and 172A. Including such a supply unit makes it possible to also supply light to the side extensions 171A and 172A of the light guide plate 17A, thereby preventing the light that exits from the front sides of the side extensions 171A and 172A from being relatively darker than the light that exits from the front side of the main body 170A. Therefore, the illumination device according to the present embodiment makes it possible to prevent irregularities in brightness in the light emitted from a light-exiting portion 17Aa of the light guide plate 17A.

Embodiment 3

Figure 5:
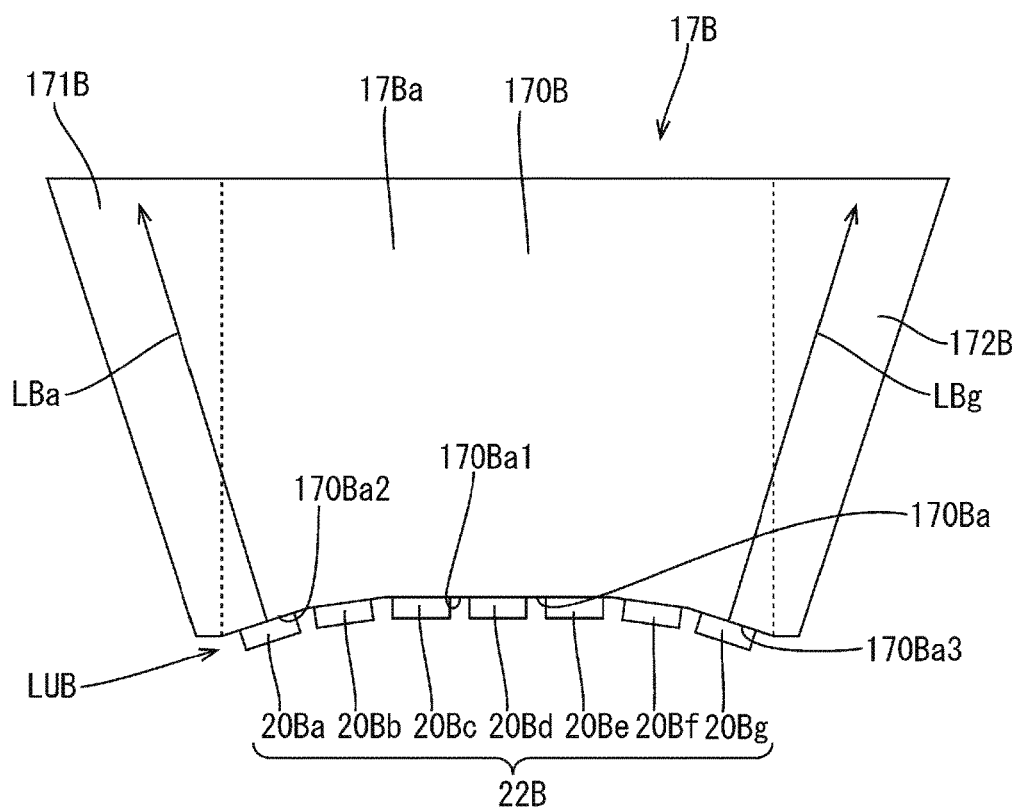
FIG. 5 is a plan view schematically illustrating a light guide plate and a row of LEDs used in an illumination device according to Embodiment 3.

Next, Embodiment 3 of the present invention will be described with reference to FIG. 5. In the present embodiment, a light guide plate 17B and an LED row (light source row) 22B used in an illumination device will be described. FIG. 5 is a plan view schematically illustrating the light guide plate 17B and the LED row 22B used in the illumination device according to Embodiment 3.

Similar to in Embodiment 1, the light guide plate 17B has an inverted trapezoidal shape overall when viewed in a plan view and includes a substantially rectangular main body 170B, a side extension 171B that is shown on the left side of FIG. 5, and a side extension 172B that is shown on the right side of FIG. 5. The near side (LED unit LUB side) end 170Ba of the main body 170B has an overall concave shape that recedes towards the far side.

The near end 170Ba of the main body 170B functions as a light-receiving portion 170Ba into which light from LEDs 20B (20Ba, 20Bb, 20Bc, 20Bd, 20Be, 20Bf, and 20Bg) in the LED row 22B enters. Moreover, in comparison to Embodiment 1, the LED row 22B includes more of the LEDs 20B, and the gaps between the adjacent LEDs 20B are smaller.

The light-receiving portion 170Ba includes a main body light-receiving portion 170Ba1 that allows light to enter the main body 170B, a side light-receiving portion 170Ba2 that allows light to enter the left side extension 171B, and a side light-receiving portion 170Ba3 that allows light to enter the right side extension 172B. Furthermore, although the side light-receiving portions 170Ba2 and 170Ba3 are angled relative to the main body light-receiving portion 170Ba1, the angle is smaller than in Embodiment 1.

In the present embodiment, the single LED 20Ba is arranged facing the side light-receiving portion 170Ba2 as a side LED (side light source), and similarly, the single LED 20Bg is arranged facing the side light-receiving portion 170Ba3 as a side LED (side light source). Furthermore, the optical axis LBa of the LED 20Ba is positioned within the left side extension 171B, and the optical axis LBg of the LED 20Bg is positioned within the right side extension 172B. Moreover, the five LEDs 20B (20Bb, 20Bc, 20Bd, 20Be, and 20Bf) arranged in the center of the LED row 22B function as center LEDs (center light sources), which are arranged such that the optical axes thereof are positioned within the main body 170B.

In addition, unlike in Embodiment 1, the main body light-receiving portion 170Ba1 of the present embodiment includes three flat portions (end faces) that are connected together into a single concave shape. Here, the main body light-receiving portion 170Ba1 includes a portion facing the LED 20Bb; a portion facing the LEDs 20Bc, 20Bd, and 20Be; and a portion facing the LED 20Bf. Furthermore, including the side light-receiving portions 170Ba2 and 170Ba3, the overall light-receiving portion 170Ba includes five flat portions (end faces) that are connected together into a single concave shape.

As described in the present embodiment, the light-receiving portion 170Ba may be constituted by a plurality of flat portions (end faces) that are connected together into a single concave shape. Configuring the light-receiving portion 170Ba in this way makes it easier to control the clearance between the LEDs 20B and the light-receiving portion 170Ba.

In the illumination device according to the present embodiment, the side light-receiving portions 170Ba2 and 170Ba3 of the light guide plate 17B and the LEDs 20Ba and 20Bg that serve as the side LEDs (side light sources) function together as a supply unit that supplies light to the side extensions 171B and 172B. Including such a supply unit makes it possible to also supply light to the side extensions 171B and 172B of the light guide plate 17B, thereby preventing the light that exits from the front sides of the side extensions 171B and 172B from being relatively darker than the light that exits from the front side of the main body 170B. Therefore, the illumination device according to the present embodiment makes it possible to prevent irregularities in brightness in the light emitted from a light-exiting portion 17Ba of the light guide plate 17B.

Embodiment 4

Figure 6:
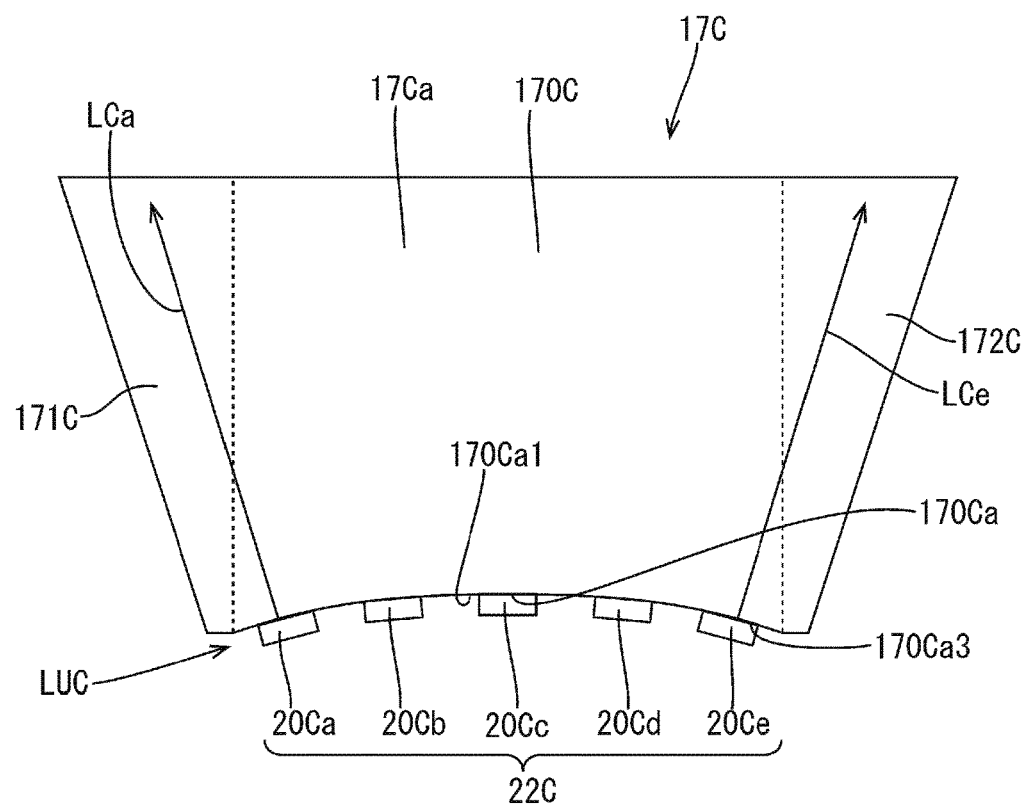
FIG. 6 is a plan view schematically illustrating a light guide plate and a row of LEDs used in an illumination device according to Embodiment 4.

Next, Embodiment 4 of the present invention will be described with reference to FIG. 6. In the present embodiment, a light guide plate 17C and an LED row (light source row) 22C used in an illumination device will be described. FIG. 6 is a plan view schematically illustrating the light guide plate 17C and the LED row 22C used in the illumination device according to Embodiment 4.

Similar to in Embodiment 1, the light guide plate 17C has an inverted trapezoidal shape overall when viewed in a plan view and includes a substantially rectangular main body 170C, a side extension 171C that is shown on the left side of FIG. 6, and a side extension 172C that is shown on the right side of FIG. 6. The near side (LED unit LUC side) end 170Ca of the main body 170C has an overall concave shape that recedes towards the far side. More specifically, the end 170Ca of the present embodiment has a smooth arc shape.

The end 170Ca functions as a light-receiving portion 170Ca into which light from LEDs 20C (20Ca, 20Cb, 20Cc, 20Cd, and 20Ce) in the LED row 22C enters. The light-receiving portion 170Ca includes a main body light-receiving portion 170Ca1 that allows light to enter the main body 170C, a side light-receiving portion 170Ca2 that allows light to enter the left side extension 171C, and a side light-receiving portion 170Ca3 that allows light to enter the right side extension 172C. The main body light-receiving portion 170Ca1 and the side light-receiving portions 170Ca2 and 170Ca3 are each smooth curved faces and are connected together into a single arc shape.

In the present embodiment, the single LED 20Ca is arranged facing the side light-receiving portion 170Ca2 as a side LED (side light source), and similarly, the single LED 20Ce is arranged facing the side light-receiving portion 170Ca3 as a side LED (side light source). Furthermore, the optical axis LCa of the LED 20Ca is positioned within the left side extension 171C, and the optical axis LCe of the LED 20Ce is positioned within the right side extension 172C. Moreover, the three LEDs 20Cb, 20Cc, and 20Cd arranged in the center of the LED row 22C function as center LEDs (center light sources), which are arranged such that the optical axes thereof are positioned within the main body 170C.

In the illumination device according to the present embodiment, the side light-receiving portions 170Ca2 and 170Ca3 of the light guide plate 17C and the LEDs 20Ca and 20Ce that serve as the side LEDs (side light sources) function together as a supply unit that supplies light to the side extensions 171C and 172C. Including such a supply unit makes it possible to also supply light to the side extensions 171C and 172C of the light guide plate 17C, thereby preventing the light that exits from the front sides of the side extensions 171C and 172C from being relatively darker than the light that exits from the front side of the main body 170C. Therefore, the illumination device according to the present embodiment makes it possible to prevent irregularities in brightness in the light emitted from a light-exiting portion 17Ca of the light guide plate 17C.

Embodiment 5

Figure 7:
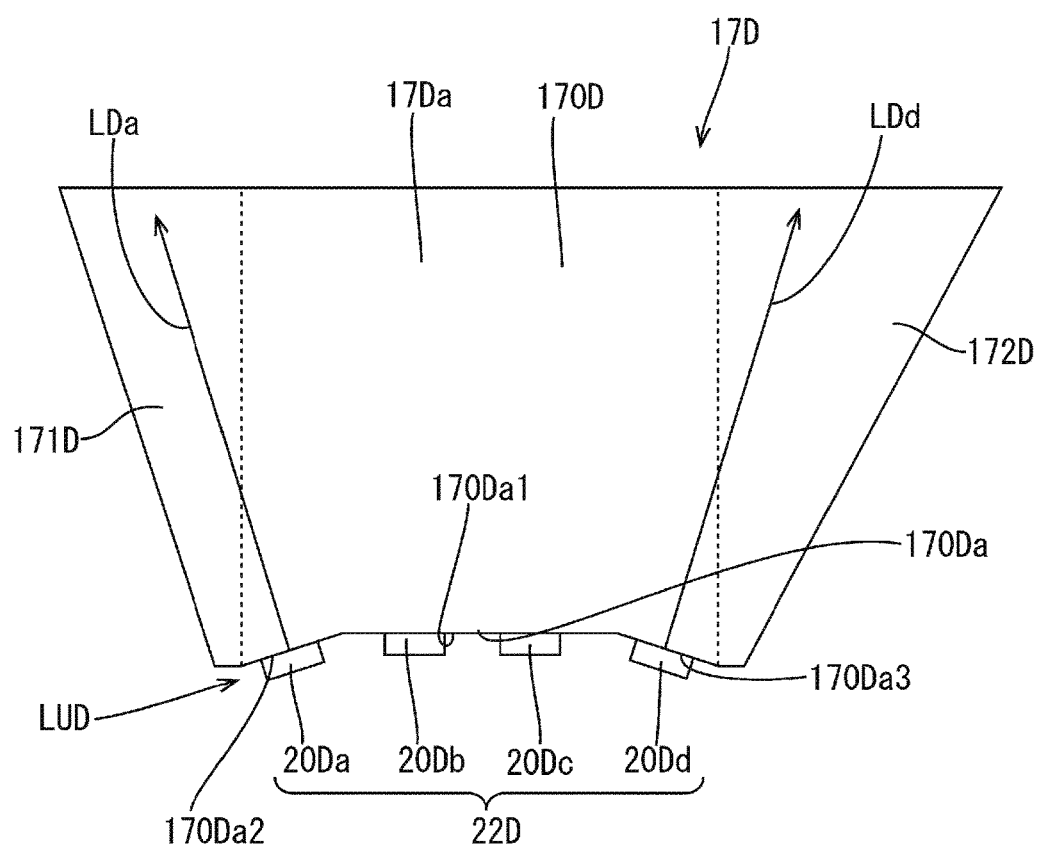
FIG. 7 is a plan view schematically illustrating a light guide plate and a row of LEDs used in an illumination device according to Embodiment 5.

Next, Embodiment 5 of the present invention will be described with reference to FIG. 7. In the present embodiment, a light guide plate 17D and an LED row (light source row) 22D used in an illumination device will be described. FIG. 7 is a plan view schematically illustrating the light guide plate 17D and the LED row 22D used in the illumination device according to Embodiment 5.

Although the light guide plate 17D has an inverted trapezoidal shape similar to in Embodiment 1 overall when viewed in a plan view, the light guide plate 17D is left-right asymmetric. Here, the light guide plate 17D includes a substantially rectangular main body 170D, a small side extension 171D that is shown on the left side of FIG. 7, and a large side extension 172D that is shown on the right side of FIG. 7. The near side (LED unit LUD side) end 170Da of the main body 170D has an overall concave shape that recedes towards the far side.

The end 170Da functions as a light-receiving portion 170Da into which light from LEDs 20D (20Da, 20Db, 20Dc, and 20Dd) in the LED row 22D enters. The light-receiving portion 170Da includes a main body light-receiving portion 170Da1 that allows light to enter the main body 170D, a side light-receiving portion 170Da2 that allows light to enter the left side extension 171D, and a side light-receiving portion 170Da3 that allows light to enter the right side extension 172D. The side light-receiving portions 170Da2 and 170Da3 are angled relative to the main body light-receiving portion 170Da1.

In the present embodiment, the single LED 20Da is arranged facing the side light-receiving portion 170Da2 as a side LED (side light source), and similarly, the single LED 20Dd is arranged facing the side light-receiving portion 170Da3 as a side LED (side light source). Furthermore, the optical axis LDa of the LED 20Da is positioned within the left side extension 171D, and the optical axis LDd of the LED 20Dd is positioned within the right side extension 172D. Moreover, the two LEDs 20Db and 20Dc arranged in the center of the LED row 22D function as center LEDs (center light sources), which are arranged such that the optical axes thereof are positioned within the main body 170D.

In the illumination device according to the present embodiment, the side light-receiving portions 170Da2 and 170Da3 of the light guide plate 17D and the LEDs 20Da and 20Dd that serve as the side LEDs (side light sources) function together as a supply unit that supplies light to the side extensions 171D and 172D. Including such a supply unit makes it possible to also supply light to the side extensions 171D and 172D of the light guide plate 17D, thereby preventing the light that exits from the front sides of the side extensions 171D and 172D from being relatively darker than the light that exits from the front side of the main body 170D. Therefore, the illumination device according to the present embodiment makes it possible to prevent irregularities in brightness in the light emitted from a light-exiting portion 17Da of the light guide plate 17D.

Embodiment 6

Figure 8:
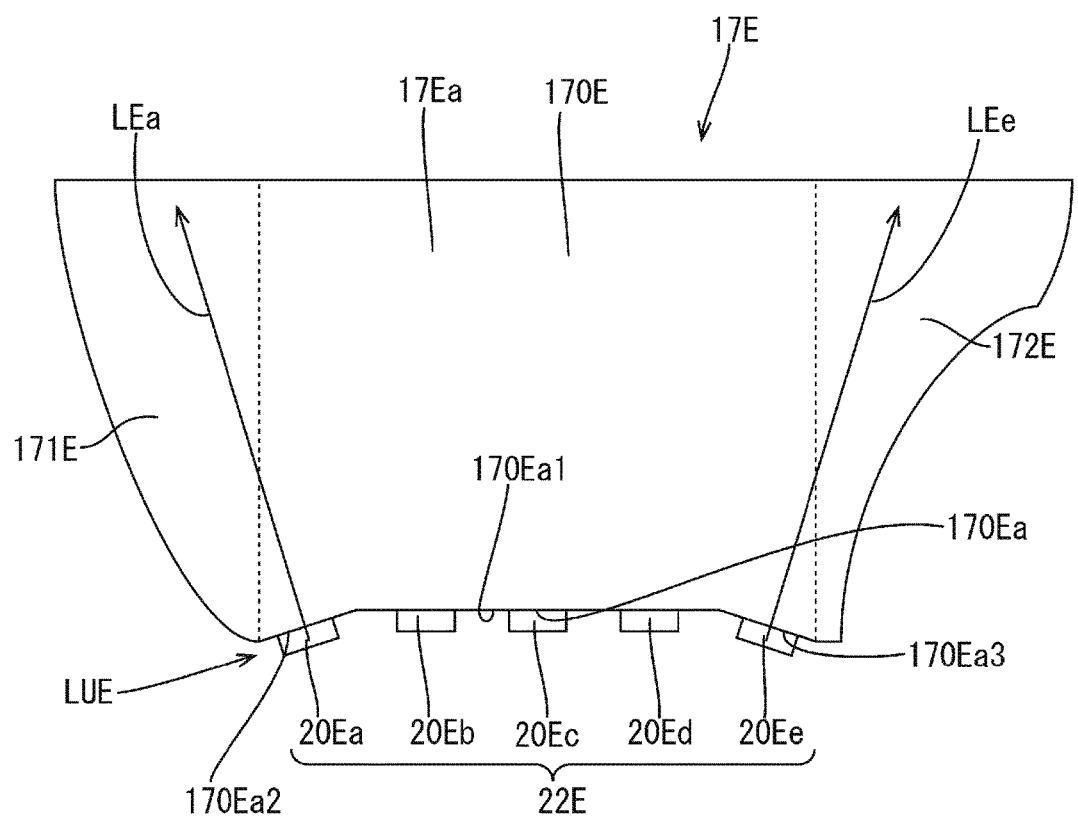
FIG. 8 is a plan view schematically illustrating a light guide plate and a row of LEDs used in an illumination device according to Embodiment 6.

Next, Embodiment 6 of the present invention will be described with reference to FIG. 8. In the present embodiment, a light guide plate 17E and an LED row (light source row) 22E used in an illumination device will be described. FIG. 8 is a plan view schematically illustrating the light guide plate 17E and the LED row 22E used in the illumination device according to Embodiment 6.

Although the light guide plate 17E has an approximately inverted trapezoidal shape overall when viewed in a plan view, the light guide plate 17F is left-right asymmetric. Here, the light guide plate 17E includes a substantially rectangular main body 170E, a side extension 171E that is shown on the left side of FIG. 8, and a side extension 172E that is shown on the right side of FIG. 8. The near side (LED unit LUE side) end 170Ea of the main body 170E has an overall concave shape that recedes towards the far side.

The end 170Ea functions as a light-receiving portion 170Ea into which light from LEDs 20E (20Ea, 20Eb, 20Ec, 20Ed, and 20Ee) in the LED row 22E enters. The light-receiving portion 170Ea includes a main body light-receiving portion 170Ea1 that is constituted by a flat end face and allows light to enter the main body 170E, a side light-receiving portion 170Ea2 that is constituted by a flat end face and allows light to enter the left side extension 171E, and a side light-receiving portion 170Ea3 that is constituted by a flat end face and allows light to enter the right side extension 172E. The side light-receiving portions 170Ea2 and 170Ea3 are angled relative to the main body light-receiving portion 170Ea1 so as to respectively face towards the side extensions 171E and 172E.

In the present embodiment, the single LED 20Ea is arranged facing the side light-receiving portion 170Ea2 as a side LED (side light source), and similarly, the single LED 20Ee is arranged facing the side light-receiving portion 170Ea3 as a side LED (side light source). Furthermore, the optical axis LEa of the LED 20Ea is positioned within the left side extension 171E, and the optical axis LEe of the LED 20Ee is positioned within the right side extension 172E. Moreover, the three LEDs 20Eb, 20Ec, and 20Ed arranged in the center of the LED row 22E function as center LEDs (center light sources), which are arranged such that the optical axes thereof are positioned within the main body 170E.

In the illumination device according to the present embodiment, the side light-receiving portions 170Ea2 and 170Ea3 of the light guide plate 17E and the LEDs 20Ea and 20Ee that serve as the side LEDs (side light sources) function together as a supply unit that supplies light to the side extensions 171E and 172E. Including such a supply unit makes it possible to also supply light to the side extensions 171E and 172E of the light guide plate 17E, thereby preventing the light that exits from the front sides of the side extensions 171E and 172E from being relatively darker than the light that exits from the front side of the main body 170E.

Therefore, the illumination device according to the present embodiment makes it possible to prevent irregularities in brightness in the light emitted from a light-exiting portion 17Ea of the light guide plate 17E.

Embodiment 7

Figure 9:
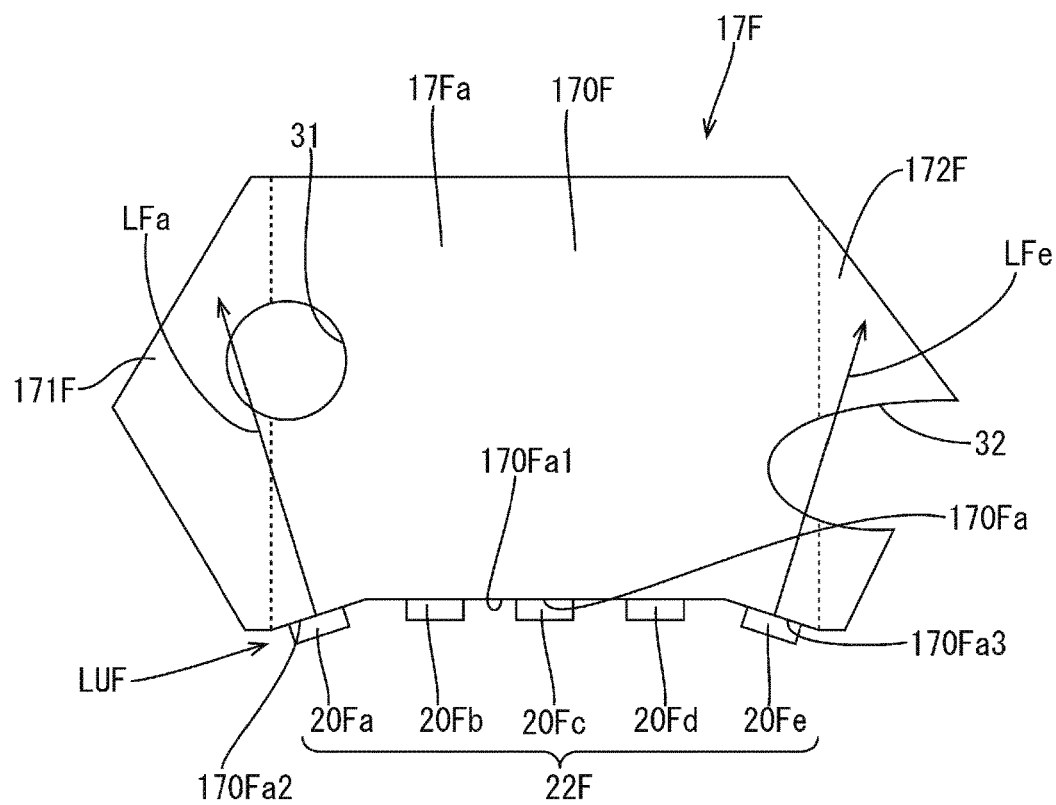
FIG. 9 is a plan view schematically illustrating a light guide plate and a row of LEDs used in an illumination device according to Embodiment 7.

Next, Embodiment 7 of the present invention will be described with reference to FIG. 9. In the present embodiment, a light guide plate 17F and an LED row (light source row) 22F used in an illumination device will be described. FIG. 9 is a plan view schematically illustrating the light guide plate 17F and the LED row 22F used in the illumination device according to Embodiment 7.

Although the light guide plate 17F has an approximately inverted trapezoidal shape overall when viewed in a plan view, the light guide plate 17F is left-right asymmetric. Furthermore, a through hole 31 that goes through the light guide plate 17F in the thickness direction and has a circular shape when viewed in a cross-sectional view and a cutout 32 formed by cutting out a portion of the side (the right side in FIG. 9) of the light guide plate 17F are formed in the light guide plate 17F. Here, the light guide plate 17F includes a substantially rectangular main body 170F, a side extension 171F that is shown on the left side of FIG. 9, and a side extension 172F that is shown on the right side of FIG. 9. Moreover, the through hole 31 is formed spanning between the left side extension 171F and the main body 170F, and the cutout 32 is formed spanning between the right side extension 172F and the main body 170F. The near side (LED unit LUF side) end 170Fa of the main body 170F has an overall concave shape that recedes towards the far side.

The end 170Fa functions as a light-receiving portion 170Fa into which light from LEDs 20F (20Fa, 20Fb, 20Fc, 20Fd, and 20Fe) in the LED row 22F enters. The light-receiving portion 170Fa includes a main body light-receiving portion 170Fa1 that is constituted by a flat end face and allows light to enter the main body 170F, a side light-receiving portion 170Fa2 that is constituted by a flat end face and allows light to enter the left side extension 171F, and a side light-receiving portion 170Fa3 that is constituted by a flat end face and allows light to enter the right side extension 172F. The side light-receiving portions 170Fa2 and 170Fa3 are angled relative to the main body light-receiving portion 170Fa1 so as to respectively face towards the side extensions 171F and 172F.

In the present embodiment, the single LED 20Fa is arranged facing the side light-receiving portion 170Fa2 as a side LED (side light source), and similarly, the single LED 20Fe is arranged facing the side light-receiving portion 170Fa3 as a side LED (side light source). Furthermore, the optical axis LFa of the LED 20Fa is positioned within the left side extension 171F. Although a portion of the through hole 31 is formed in the left side extension 171F, the optical axis LFa of the LED 20Fa is positioned so as to cross through the through hole 31. In addition, the optical axis LFe of the LED 20Fe is positioned within the right side extension 172F. Although a portion of the cutout 32 is formed in the right side extension 172F, the optical axis LFe of the LED 20Fe is positioned so as cross through the cutout 32. The three LEDs 20Fb, 20Fc, and 20Fd arranged in the center of the LED row 22F function as center LEDs (center light sources), which are arranged such that the optical axes thereof are positioned within the main body 170F.

It should be noted that although in the present embodiment an example in which the optical axis LFa of the LED 20Fa crosses through the through hole 31 and the optical axis LFe of the LED 20Fe crosses through the cutout 32 was described, this is only one possible embodiment of the present invention, and the present invention is not limited to this embodiment. For example, in another embodiment, the optical axes of the LEDs may be arranged not crossing through the through hole and the cutout.

In the illumination device according to the present embodiment, the side light-receiving portions 170Fa2 and 170Fa3 of the light guide plate 17F and the LEDs 20Fa and 20Fe that serve as the side LEDs (side light sources) function together as a supply unit that supplies light to the side extensions 171F and 172F. Including such a supply unit makes it possible to also supply light to the side extensions 171F and 172F of the light guide plate 17F, thereby preventing the light that exits from the front sides of the side extensions 171F and 172F from being relatively darker than the light that exits from the front side of the main body 170F. Therefore, the illumination device according to the present embodiment makes it possible to prevent irregularities in brightness in the light emitted from a light-exiting portion 17Fa of the light guide plate 17F.

Embodiment 8

Figure 10:
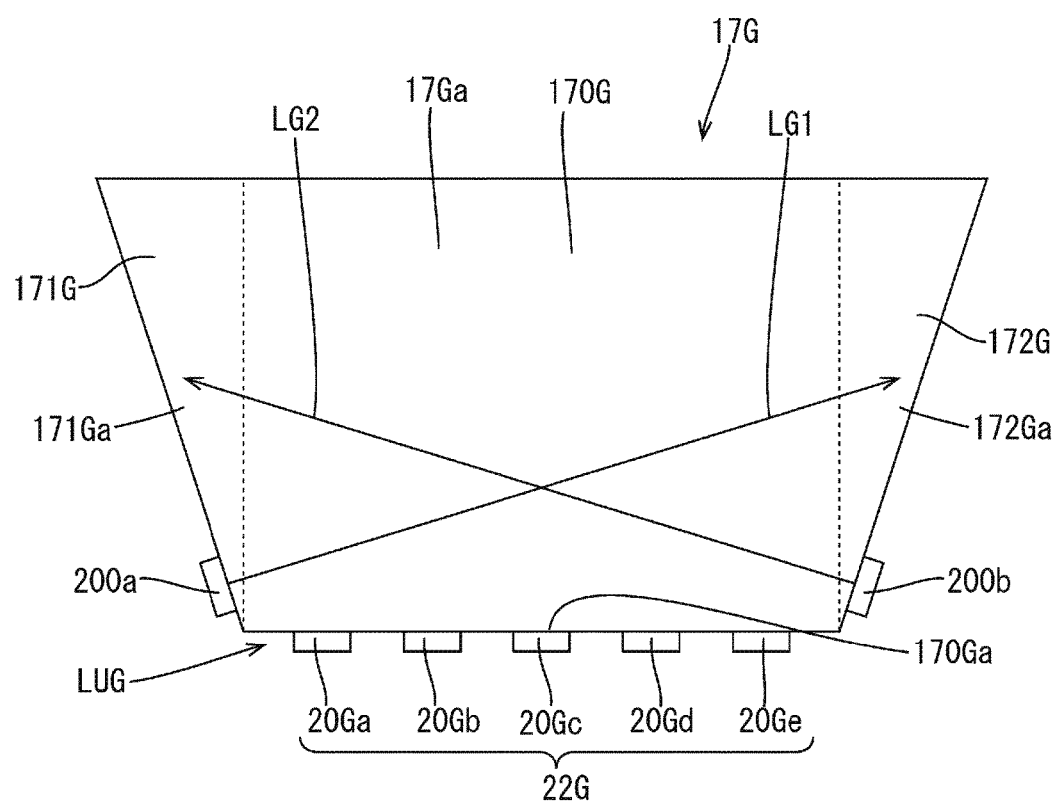
FIG. 10 is a plan view schematically illustrating a light guide plate and a row of LEDs used in an illumination device according to Embodiment 8.

Next, Embodiment 8 of the present invention will be described with reference to FIG. 10. In the present embodiment, a light guide plate 17G and an LED row (light source row) 22G used in an illumination device will be described. FIG. 10 is a plan view schematically illustrating the light guide plate 17G and the LED row 22G used in the illumination device according to Embodiment 8.

The light guide plate 17G has a left-right symmetric inverted trapezoidal shape overall when viewed in a plan view. The light guide plate 17G includes a rectangular main body 170G, a triangular (inverted triangle-shaped) side extension 171G that is shown on the left side of FIG. 10, and a triangular (inverted triangle-shaped) side extension 172G that is shown on the right side of FIG. 10. The near side (LED unit LUG side) end 170Ga of the main body 170G (that is, the near side end of the light guide plate 17G) has a flat shape that extends in the left-to-right direction.

The end 170Ga faces the LED row 22G of the LED unit LUG and functions as a light-receiving portion 170Ga into which light from LEDs 20G (20Ga, 20Gb, 20Gc, 20Gd, and 20Ge) in the LED row 22G enters. The LED unit LUG of the present embodiment supplies light to primarily the main body 170G. As will be described below, the illumination device according to the present embodiment also includes LEDs 200a and 200b as two secondary light sources that are separate from the LED unit LUG.

The side edges of the light guide plate 17G are respectively constituted by an angled side 171Ga of the side extension 171G and an angled side 172Ga of the side extension 172G. The angled side 171Ga and the angled side 172Ga are arranged on either side of the light-receiving portion 170Ga and facing one another.

An LED 200a is arranged facing the angled side 171Ga of the left side extension 171G as a secondary light source. The LED 200a is a secondary light source that supplies light that enters the angled side 171Ga of the one side extension 171G and proceeds towards the other side extension 172G arranged on the opposite side.

The LED 200a is arranged facing the outer side 171Ga of the one side extension 171G and supplies light that crosses through the main body 170G at an angle from the left side to the right side thereof while proceeding towards the other side extension 172G. In FIG. 10, LG1 is the optical axis of the LED 200a.

Similarly, an LED 200b is arranged facing the angled side 172Ga of the right side extension 172G as a secondary light source. The LED 200b is a secondary light source that supplies light that enters the angled side 172Ga of the other side extension 172G and proceeds towards the one side extension 171G arranged on the opposite side.

The LED 200b is arranged facing the outer side 172Ga of the other side extension 172G and supplies light that crosses through the main body 170G at an angle from the left side to the right side thereof while proceeding towards the one side extension 171G. In FIG. 10, LG2 is the optical axis of the LED 200b.

Unlike the LEDs 20G of the LED unit LUG, the LEDs 200a and 200b emit light towards the side extensions 171G and 172G. Furthermore, the sides 171Ga and 172Ga function as secondary light source light-receiving portions that allow light from the LEDs 200a and 200b (the secondary light sources) to enter.

In the illumination device according to the present embodiment, the LEDs 200a and 200b that serve as the secondary light sources function as a supply unit that supplies light to the side extensions 171G and 172G. Including such a supply unit makes it possible to also supply light to the side extensions 171G and 172G of the light guide plate 17G, thereby preventing the light that exits from the front sides of the side extensions 171G and 172G from being relatively darker than the light that exits from the front side of the main body 170G. Therefore, the illumination device according to the present embodiment makes it possible to prevent irregularities in brightness in the light emitted from a light-exiting portion 17Ga of the light guide plate 17G.

Embodiment 9

Figure 11:
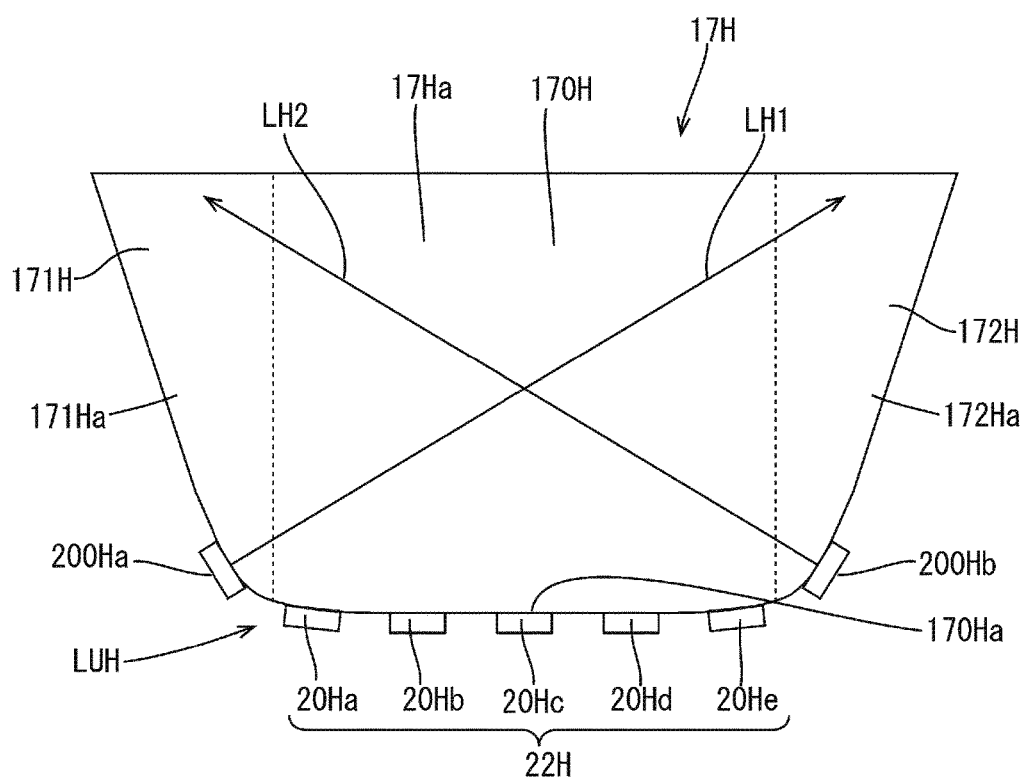
FIG. 11 is a plan view schematically illustrating a light guide plate and a row of LEDs used in an illumination device according to Embodiment 9.
Figure 11:
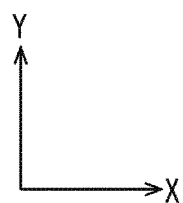

Next, Embodiment 9 of the present invention will be described with reference to FIG. 11. In the present embodiment, a light guide plate 17H and an LED row (light source row) 22H used in an illumination device will be described. FIG. 11 is a plan view schematically illustrating the light guide plate 17H and the LED row 22H used in the illumination device according to Embodiment 9.

The light guide plate 17H is left-right symmetric when viewed in a plan view and has a substantially inverted trapezoidal shape overall in which the bottom side is rounded. The light guide plate 17H includes a substantially rectangular main body 170H, a substantially triangular (substantially inverted triangle-shaped) side extension 171H that is shown on the left side of FIG. 11, and a substantially triangular (substantially inverted triangle-shaped) side extension 172H that is shown on the right side of FIG. 11. The near side (LED unit LUH side) end 170Ha of the main body 170H (that is, the near side end of the light guide plate 17H) has a smooth arc shape that runs in the left-to-right direction and bulges out towards the LED unit LUH side.

The end 170Ha faces the LED row 22H of the LED unit LUH and functions as a light-receiving portion 170Ha into which light from LEDs 20H (20Ha, 20Hb, 20Hc, 20Hd, and 20He) in the LED row 22H enters. The LED unit LUH of the present embodiment supplies light to primarily the main body 170H. As will be described below, the illumination device according to the present embodiment also includes LEDs 200Ha and 200Hb as two secondary light sources that are separate from the LED unit LUH.

The side edges of the light guide plate 17H are respectively constituted by an angled side 171Ha of the side extension 171H and an angled side 172Ha of the side extension 172H. The angled side 171Ha and the angled side 172Ha are arranged on either side of the light-receiving portion 170Ha and facing one another. Moreover, the angled sides 171Ha and 172Ha have a rounded shape near the light-receiving portion 170Ha.

An LED 200Ha is arranged facing the angled side 171Ha of the left side extension 171H as a secondary light source. The LED 200Ha is a secondary light source that supplies light that enters the angled side 171Ha of the one side extension 171H and proceeds towards the other side extension 172H arranged on the opposite side.

The LED 200Ha is arranged facing the outer side 171Ha of the one side extension 171H and supplies light that crosses through the main body 170H at an angle from the left side to the right side thereof while proceeding towards the other side extension 172H. In FIG. 11, LH1 is the optical axis of the LED 200Ha.

Similarly, an LED 200Hb is arranged facing the angled side 172Ha of the right side extension 172H as a secondary light source. The LED 200Hb is a secondary light source that supplies light that enters the angled side 172Ha of the other side extension 172H and proceeds towards the one side extension 171H arranged on the opposite side.

The LED 200Hb is arranged facing the outer side 172Ha of the other side extension 172H and supplies light that crosses through the main body 170H at an angle from the left side to the right side thereof while proceeding towards the one side extension 171H. In FIG. 11, LH2 is the optical axis of the LED 200Hb.

Unlike the LEDs 20H of the LED unit LUH, the LEDs 200Ha and 200Hb emit light towards the side extensions 171H and 172H. Furthermore, the sides 171Ha and 172Ha function as secondary light source light-receiving portions that allow light from the LEDs 200Ha and 200Hb (the secondary light sources) to enter.

In the illumination device according to the present embodiment, the LEDs 200Ha and 200Hb that serve as the secondary light sources function as a supply unit that supplies light to the side extensions 171H and 172H. Including such a supply unit makes it possible to also supply light to the side extensions 171H and 172H of the light guide plate 17H, thereby preventing the light that exits from the front sides of the side extensions 171H and 172H from being relatively darker than the light that exits from the front side of the main body 170H. Therefore, the illumination device according to the present embodiment makes it possible to prevent irregularities in brightness in the light emitted from a light-exiting portion 17Ha of the light guide plate 17H.

Embodiment 10

Figure 12:
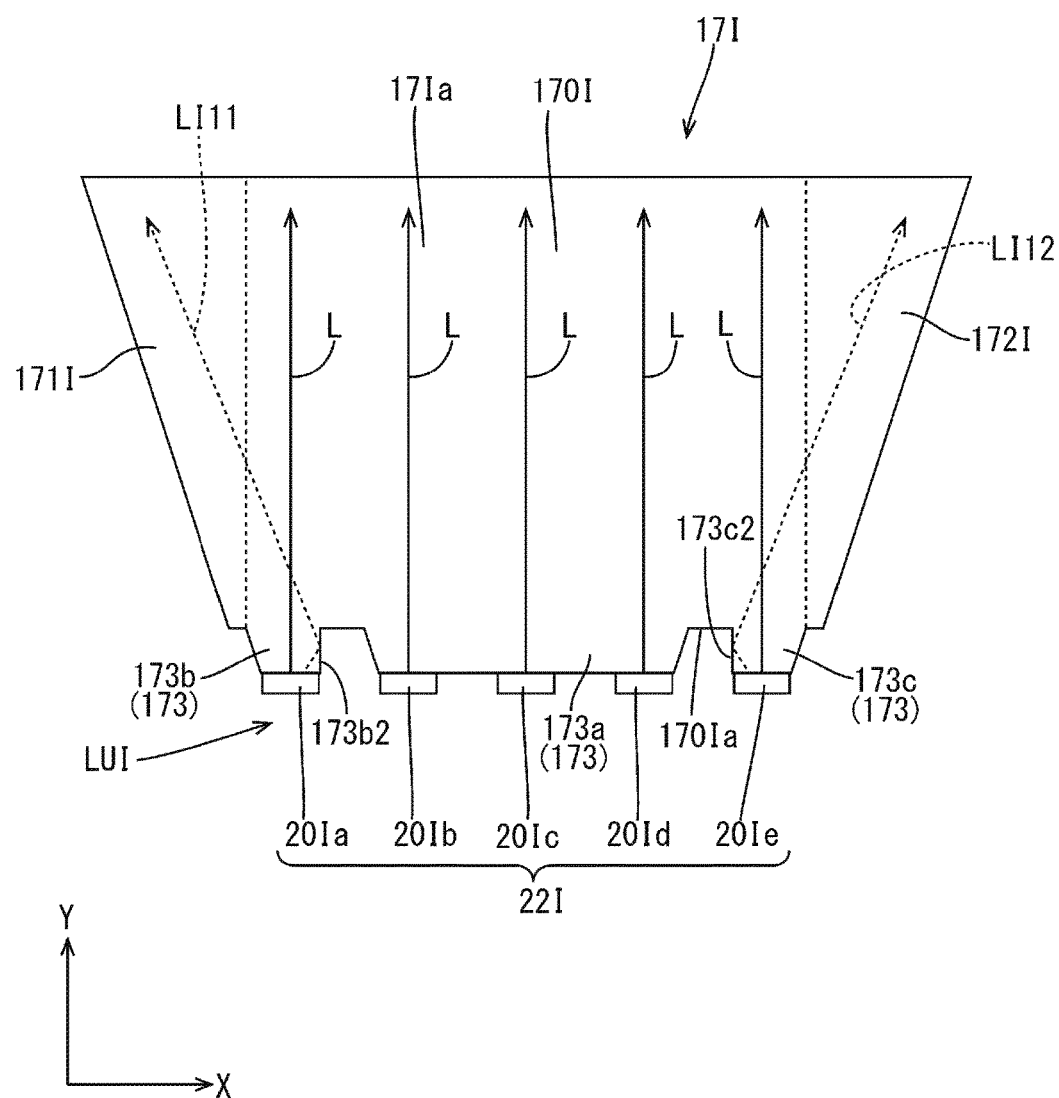
FIG. 12 is a plan view schematically illustrating a light guide plate and a row of LEDs used in an illumination device according to Embodiment 10.

Next, Embodiment 10 of the present invention will be described with reference to FIGS. 12 and 13. In the present embodiment, a light guide plate 17I and an LED row (light source row) 22I used in an illumination device will be described. FIG. 12 is a plan view schematically illustrating the light guide plate 17I and the LED row 22I used in the illumination device according to Embodiment 10.

The light guide plate 17I has a left-right symmetric and approximately inverted trapezoidal shape overall when viewed in a plan view. The light guide plate 17I includes a substantially rectangular main body 170I, a substantially triangular (substantially inverted triangle-shaped) side extension 171I that is shown on the left side of FIG. 12, and a substantially triangular (substantially inverted triangle-shaped) side extension 172I that is shown on the right side of FIG. 12.

A light-receiving portion 173 that allows light to enter the light guide plate 17I is formed in the near side (LED unit LUI side) end 170Ia of the main body 170I (that is, in the near side end of the light guide plate 17I).

The light-receiving portion 173 includes a main body light-receiving portion 173a that faces and receives light from three LEDs 20Ib, 20Ic, and 20Id arranged in the center of the LED row 22I of the LED unit LUI. The main body light-receiving portion 173a has a shape that protrudes out from the end 170Ia of the main body 17I towards the LED unit LUI side, and the portion that faces the LEDs 20I (20Ib, 20Ic, and 20Id) has a flat plane shape. The light from the LEDs 20I enters the main body 170I via this flat plane-shaped portion.

The light-receiving portion 173 also includes a side light-receiving portion 173b that faces and receives light from an LED 20Ia arranged on the left end of the LED row 22I of the LED unit LUI. The LED 20Ia is a light source for supplying light to the left side extension 171I and will in some cases be referred to as a "side light source" (or "side LED").

The side light-receiving portion 173b is a protrusion-shaped structure that protrudes out from the end (one end) 170Ia of the main body 170I towards the LED 20Ia (the side light source) and receives the light emitted from that LED 20Ia.

Figure 13:
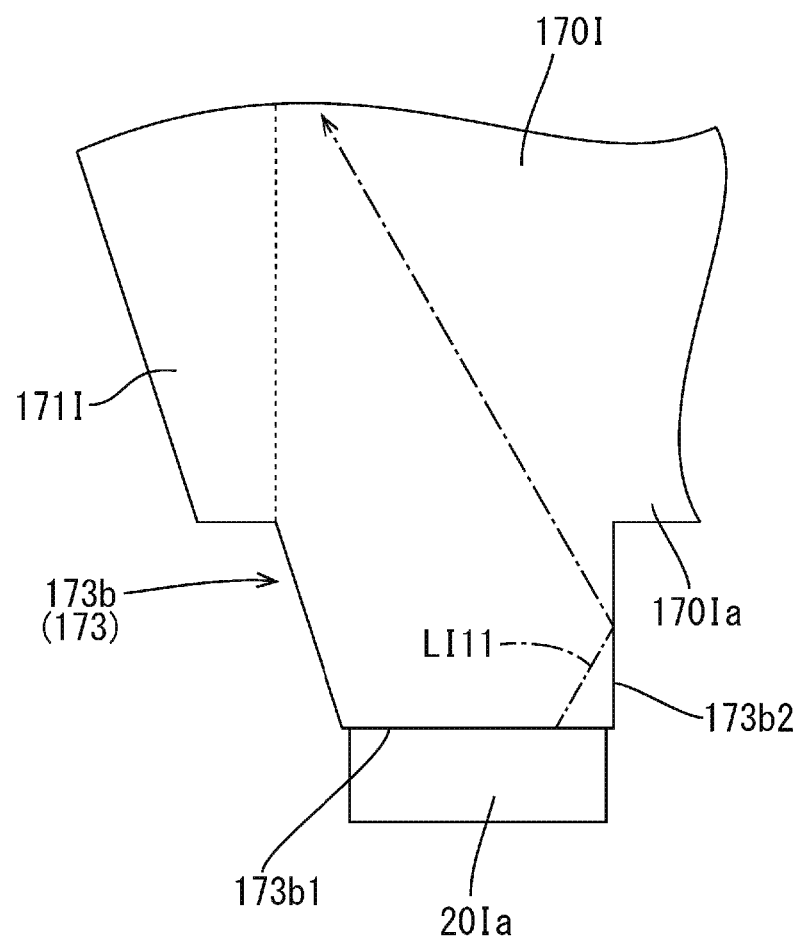
FIG. 13 is an enlarged view of an LED (a side light source) and a side light-receiving portion that faces the LED as illustrated in FIG. 12.

FIG. 13 is an enlarged view of the LED 20Ia (the side light source) and the side light-receiving portion 173b that faces the LED 20Ia as illustrated in FIG. 12. The side light-receiving portion 173b faces the LED 20Ia (the side light source) and includes a light-receiving end face 173b1 into which light from the LED 20Ia enters as well as a reflective wall 173b2 that is constituted by a portion of the peripheral wall surrounding the light-receiving end face 173b1 and that reflects or scatters the light that enters the light-receiving end face 173b1 in order to supply light towards the side extension 171I.

The light-receiving end face 173b1 has a flat plane shape and faces the light-emitting face of the LED 20Ia. As illustrated in FIG. 13, the reflective wall 173b2 is arranged on the side of the peripheral wall of the side light-receiving portion 173b that is farther away from the side extension 171I (that is, on the center LED 20Ib side). The reflective wall 173b2 is arranged running in the same direction as the optical axes L of the LEDs 20I (that is, in the Y axis direction).

Of the light emitted from the LED 20Ia, the light LI11 that proceeds towards the reflective wall 173b2 at a prescribed angle relative to the optical axis L reflects off of the reflective wall 173b2 and then continues towards the side extension 171I. In this way, of the light emitted from the LED 20Ia, a portion of the light that travels towards the reflective wall 173b2 reflects off of that reflective wall 173b2 and is supplied to the side extension 171I.

Furthermore, as illustrated in FIG. 12, the light-receiving portion 173 also includes a side light-receiving portion 173c that faces and receives light from an LED 20Ie arranged on the right end of the LED row 22I of the LED unit LUI. The LED 20Ie is a light source for supplying light to the right side extension 172I and will in some cases be referred to as a "side light source" (or "side LED").

The side light-receiving portion 173c is a protrusion-shaped structure that protrudes out from the end (the one end) 170Ia of the main body 170I towards the LED 20Ie (the side light source) and receives the light emitted from that LED 20Ie.

Moreover, the side light-receiving portion 173c is left-right symmetric to the side light-receiving portion 173b described above and has the same basic configuration as that side light-receiving portion 173b, and therefore a detailed description will be omitted here. A portion LI12 of the light emitted from the LED 20Ie reflects off of a reflective wall 173c2 and is supplied towards the side extension 172I.

Furthermore, the optical axes L of the LEDs 20I (20Ia, 20Ib, 20Ic, 20Id, and 20Ie) of the LED unit LUI are all arranged so as to be positioned within the main body 170I.

In the illumination device according to the present embodiment, the reflective walls 173b2 and 173c2 function as a supply unit that supplies light emitted from the LEDs 20Ia and 20Ie (the side light sources) to the side extensions 171I and 172I. Including such a supply unit makes it possible to also supply light to the side extensions 171I and 172I of the light guide plate 17I, thereby preventing the light that exits from the front sides of the side extensions 171I and 172I from being relatively darker than the light that exits from the front side of the main body 170I. Therefore, the illumination device according to the present embodiment makes it possible to prevent irregularities in brightness in the light emitted from a light-exiting portion 17Ia of the light guide plate 17I.

Embodiment 11

Figure 14:
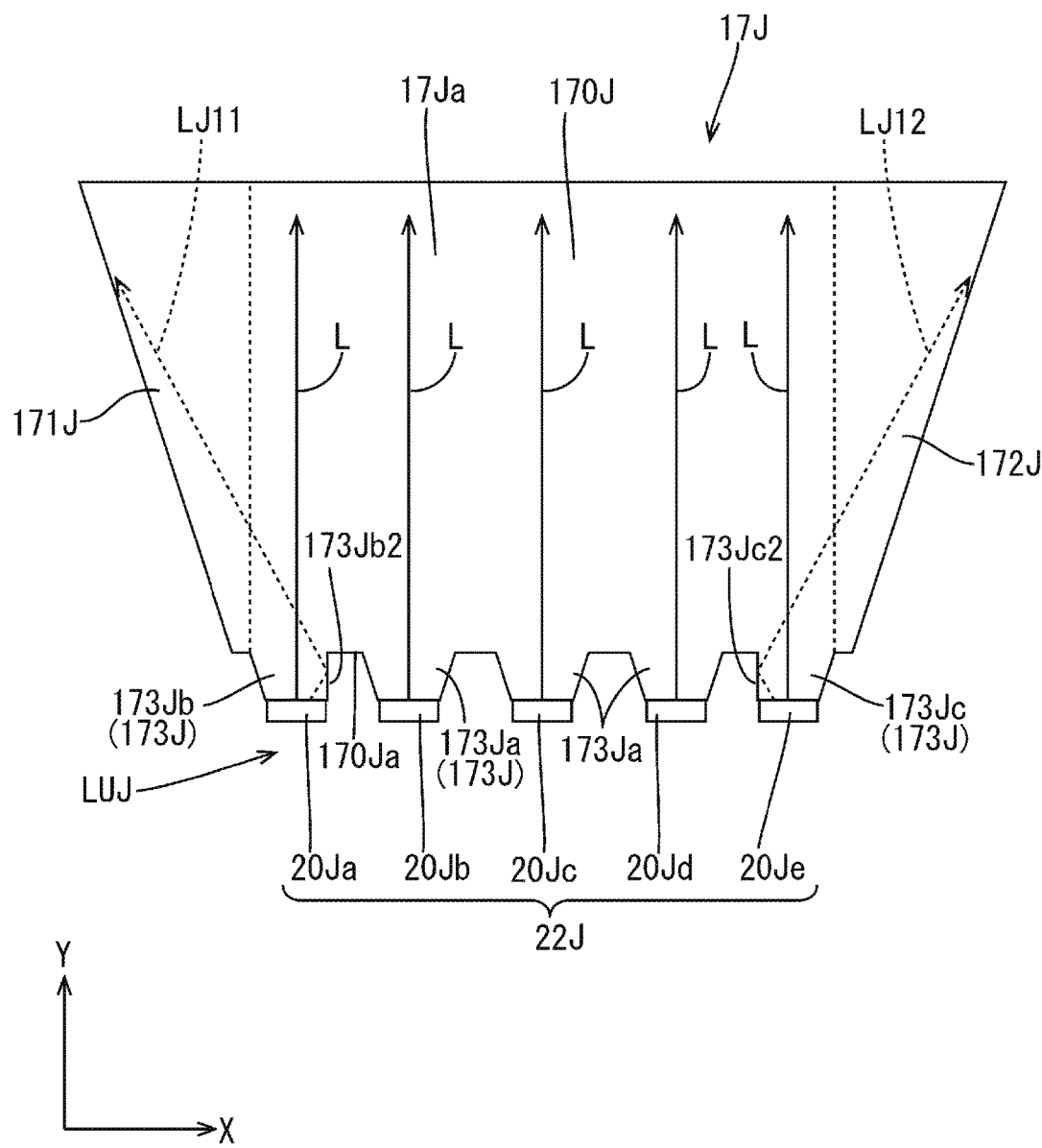
FIG. 14 is a plan view schematically illustrating a light guide plate and a row of LEDs used in an illumination device according to Embodiment 11.

Next, Embodiment 11 of the present invention will be described with reference to FIG. 14. In the present embodiment, a light guide plate 17J and an LED row (light source row) 22J used in an illumination device will be described. FIG. 14 is a plan view schematically illustrating the light guide plate 17J and the LED row 22J used in the illumination device according to Embodiment 11.

The light guide plate 17J has a left-right symmetric and approximately inverted trapezoidal shape overall when viewed in a plan view. The light guide plate 17J includes a substantially rectangular main body 170J, a substantially triangular (substantially inverted triangle-shaped) side extension 171J that is shown on the left side of FIG. 14, and a substantially triangular (substantially inverted triangle-shaped) side extension 172J that is shown on the right side of FIG. 14.

A light-receiving portion 173J that allows light to enter the light guide plate 17J is formed in the near side (LED unit LUJ side) end 170Ja of the main body 170J (that is, in the near side end of the light guide plate 17J).

The light-receiving portion 173J includes three separate main body light-receiving portions 173Ja that respectively face three LEDs 20Jb, 20Jc, and 20Jd arranged in the center of the LED row 22J of the LED unit LUJ and that receive light from the LEDs 20Jb, 20Jc, and 20Jd. In other words, each of the main body light-receiving portions 173Ja is assigned to one of the LEDs 20J. Each main body light-receiving portion 173Ja has a protrusion shape that protrudes out from the end 170Ja of the main body 17J towards the LED unit LUJ side, and the portion that faces the LEDs 20J (20Jb, 20Jc, and 20Jd) has a flat plane shape. The light from the respective LED 20J enters the main body 170J via this flat plane-shaped portion.

The light-receiving portion 173J also includes a side light-receiving portion 173Jb that faces and receives light from an LED 20Ja arranged on the left end of the LED row 22J of the LED unit LUJ. The LED 20Ja is a light source for supplying light to the left side extension 171J and will in some cases be referred to as a "side light source" (or "side LED").

The side light-receiving portion 173Jb is a protrusion-shaped structure that protrudes out from the end (one end) 170Ja of the main body 170J towards the LED 20Ja (the side light source) and receives the light emitted from that LED 20Ja.

The side light-receiving portion 173Jb faces the LED 20Ja (the side light source) and includes a light-receiving end face 173Jb1 into which light from the LED 20Ja enters as well as a reflective wall 173Jb2 that is constituted by a portion of the peripheral wall surrounding the light-receiving end face 173Jb1 and that reflects or scatters the light that enters the light-receiving end face 173Jb1 in order to supply light towards the side extension 171J.

The light-receiving end face 173Jb1 has a flat plane shape and faces the light-emitting face of the LED 20Ja. The reflective wall 173Jb2 is arranged on the side of the peripheral wall of the side light-receiving portion 173Jb that is farther away from the side extension 171J (that is, on the center LED 20Jb side). The reflective wall 173Jb2 is arranged running in the same direction as the optical axes L of the LEDs 20J (that is, in the Y axis direction).

Of the light emitted from the LED 20Ja, the light LJ11 that proceeds towards the reflective wall 173Jb2 at a prescribed angle relative to the optical axis L reflects off of the reflective wall 173Jb2 and then continues towards the side extension 171J. In this way, of the light emitted from the LED 20Ja, a portion of the light that travels towards the reflective wall 173Jb2 reflects off of that reflective wall 173Jb2 and is supplied to the side extension 171J.

Furthermore, as illustrated in FIG. 14, the light-receiving portion 173J also includes a side light-receiving portion 173Jc that faces and receives light from an LED 20Je arranged on the right end of the LED row 22J of the LED unit LUJ. The LED 20Je is a light source for supplying light to the right side extension 172J and will in some cases be referred to as a "side light source" (or "side LED").

The side light-receiving portion 173Jc is a protrusion-shaped structure that protrudes out from the end (the one end) 170Ja of the main body 170J towards the LED 20Je (the side light source) and receives the light emitted from that LED 20Je.

Moreover, the side light-receiving portion 173Jc is left-right symmetric to the side light-receiving portion 173Jb described above and has the same basic configuration as that side light-receiving portion 173Jb, and therefore a detailed description will be omitted here. A portion LJ12 of the light emitted from the LED 20Je reflects off of a reflective wall 173Jc2 and is supplied towards the side extension 172J.

Furthermore, the optical axes L of the LEDs 20J (20Ja, 20Jb, 20Jc, 20Jd, and 20Je) of the LED unit LUJ are all arranged so as to be positioned within the main body 170J.

In the illumination device according to the present embodiment, the reflective walls 173Jb2 and 173Jc2 function as a supply unit that supplies light emitted from the LEDs 20Ja and 20Je (the side light sources) to the side extensions 171J and 172J. Including such a supply unit makes it possible to also supply light to the side extensions 171J and 172J of the light guide plate 17J, thereby preventing the light that exits from the front sides of the side extensions 171J and 172J from being relatively darker than the light that exits from the front side of the main body 170J. Therefore, the illumination device according to the present embodiment makes it possible to prevent irregularities in brightness in the light emitted from a light-exiting portion 17Ja of the light guide plate 17J.

Embodiment 12

Figure 15:
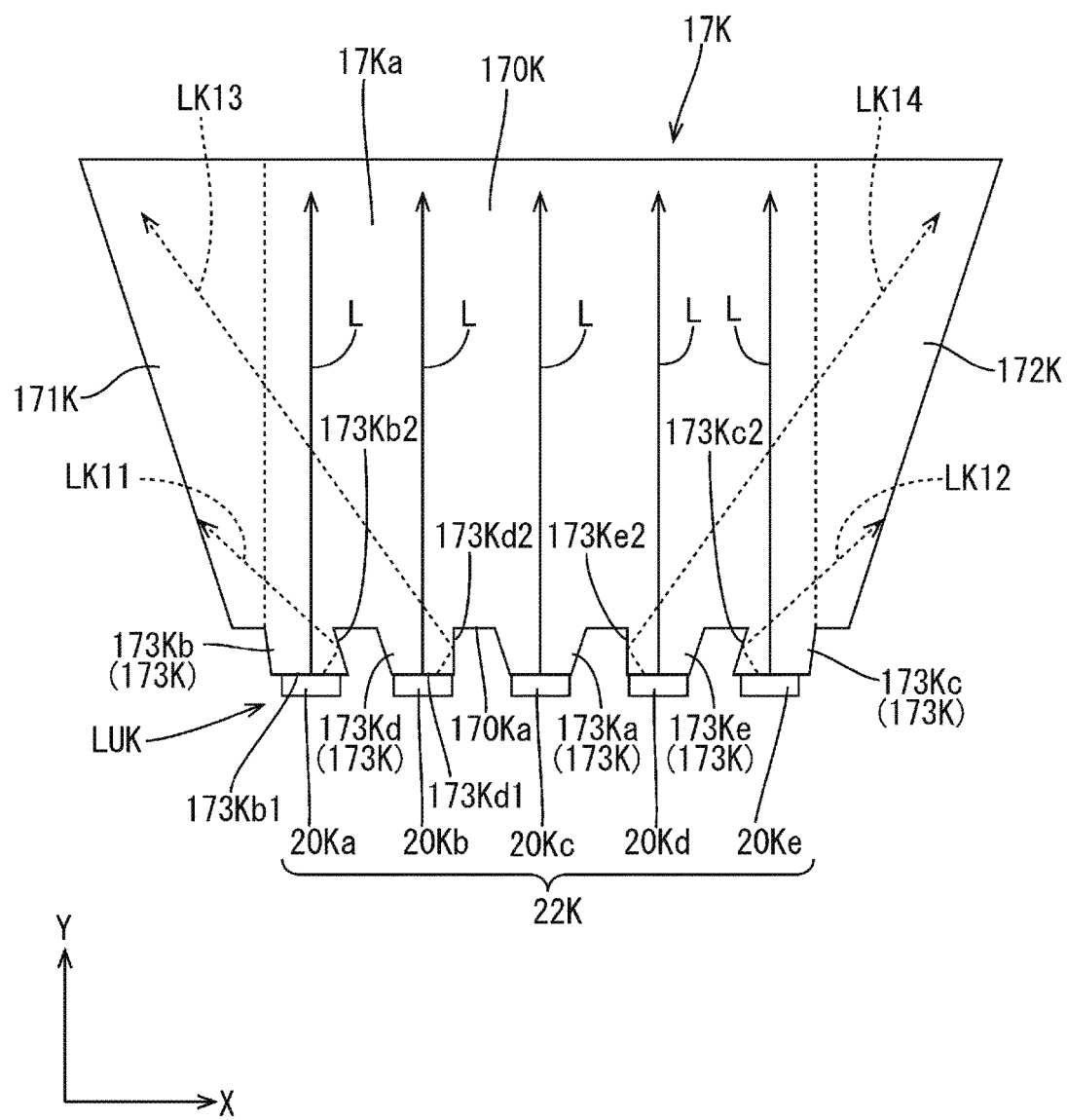
FIG. 15 is a plan view schematically illustrating a light guide plate and a row of LEDs used in an illumination device according to Embodiment 12.

Next, Embodiment 12 of the present invention will be described with reference to FIG. 15. In the present embodiment, a light guide plate 17K and an LED row (light source row) 22K used in an illumination device will be described. FIG. 15 is a plan view schematically illustrating the light guide plate 17K and the LED row 22K used in the illumination device according to Embodiment 12.

The light guide plate 17K has a left-right symmetric and approximately inverted trapezoidal shape overall when viewed in a plan view. The light guide plate 17K includes a substantially rectangular main body 170K, a substantially triangular (substantially inverted triangle-shaped) side extension 171K that is shown on the left side of FIG. 15, and a substantially triangular (substantially inverted triangle-shaped) side extension 172K that is shown on the right side of FIG. 15.

A light-receiving portion 173K that allows light to enter the light guide plate 17K is formed in the near side (LED unit LUK side) end 170Ka of the main body 170K (that is, in the near side end of the light guide plate 17K).

The light-receiving portion 173K includes a main body light-receiving portion 173Ka that faces a single LED 20Kc arranged in the center of the LED row 22K of the LED unit LUK and receives light from that LED 20Kc. The main body light-receiving portion 173Ka has a protrusion shape that protrudes out from the end 170Ka of the main body 170K towards the LED unit LUK side, and the portion that faces the LED 20Kc has a flat plane shape. The light from the LED 20Kc enters the main body 170K via this flat plane-shaped portion.

The light-receiving portion 173K also includes a side light-receiving portion 173Kb that faces and receives light from an LED 20Ka arranged on the left end of the LED row 22K of the LED unit LUK. The LED 20Ka is a light source for supplying light to the left side extension 171K and will in some cases be referred to as a "side light source" (or "side LED").

The side light-receiving portion 173Kb is a protrusion-shaped structure that protrudes out from the end (one end) 170Ka of the main body 170K towards the LED 20Ka (the side light source) and receives the light emitted from that LED 20Ka.

The side light-receiving portion 173Kb faces the LED 20Ka (the side light source) and includes a light-receiving end face 173Kb1 into which light from the LED 20Ka enters as well as a reflective wall 173Kb2 that is constituted by a portion of the peripheral wall surrounding the light-receiving end face 173Kb1 and that reflects or scatters the light that enters the light-receiving end face 173Kb1 in order to supply light towards the side extension 171K.

The light-receiving end face 173Kb1 has a flat plane shape and faces the light-emitting face of the LED 20Ka. The reflective wall 173Kb2 is arranged on the side of the peripheral wall of the side light-receiving portion 173Kb that is farther away from the side extension 171K (that is, on the center LED 20Kb side). Moreover, when viewed in a plan view, the reflective wall 173Kb2 is angled towards the left side extension 171K going from the near side towards the far side.

Of the light emitted from the LED 20Ka, the light LK11 that proceeds towards the reflective wall 173Kb2 at a prescribed angle relative to the optical axis L reflects off of the reflective wall 173Kb2 and then continues towards the side extension 171K. In this way, of the light emitted from the LED 20Ka, a portion of the light that travels towards the reflective wall 173Kb2 reflects off of that reflective wall 173Kb2 and is supplied to the side extension 171K.

Furthermore, as illustrated in FIG. 15, the light-receiving portion 173K also includes a side light-receiving portion 173Kc that faces and receives light from an LED 20Ke arranged on the right end of the LED row 22K of the LED unit LUK. The LED 20Ke is a light source for supplying light to the right side extension 172K and will in some cases be referred to as a "side light source" (or "side LED").

The side light-receiving portion 173Kc is a protrusion-shaped structure that protrudes out from the end (the one end) 170Ka of the main body 170K towards the LED 20Ke (the side light source) and receives the light emitted from that LED 20Ke.

Moreover, the side light-receiving portion 173Kc is left-right symmetric to the side light-receiving portion 173Kb described above and has the same basic configuration as that side light-receiving portion 173Kb, and therefore a detailed description will be omitted here. A portion LK12 of the light emitted from the LED 20Ke reflects off of a reflective wall 173Kc2 and is supplied towards the side extension 172K.

Furthermore, the light-receiving portion 173K also includes a side light-receiving portion 173Kd that faces and receives light from an LED 20Kb arranged second from the left end of the LED row 22K of the LED unit LUK. The LED 20Kb is a light source for supplying light to the left side extension 171K and will in some cases be referred to as a "side light source" (or "side LED").

The side light-receiving portion 173Kd is a protrusion-shaped structure that protrudes out from the end (the one end) 170Ka of the main body 170K towards the LED 20Kb (the side light source) and receives the light emitted from that LED 20Kb.

The side light-receiving portion 173Kd faces the LED 20Kb (the side light source) and includes a light-receiving end face 173Kd1 into which light from the LED 20Kb enters as well as a reflective wall 173Kd2 that is constituted by a portion of the peripheral wall surrounding the light-receiving end face 173Kd1 and that reflects or scatters the light that enters the light-receiving end face 173Kd1 in order to supply light towards the side extension 171K.

The light-receiving end face 173Kd1 has a flat plane shape and faces the light-emitting face of the LED 20Kb. The reflective wall 173Kd2 is arranged on the side of the peripheral wall of the side light-receiving portion 173Kd that is farther away from the side extension 171K (that is, on the center LED 20Kc side). Moreover, when viewed in a plan view, the reflective wall 173Kd2 has a shallower angle than the reflective wall 173Kb2 of the side light-receiving portion 173Kb and is arranged running in the same direction as the optical axes L of the LEDs 20K (that is, in the Y axis direction).

Of the light emitted from the LED 20Kb, the light LK13 that proceeds towards the reflective wall 173Kd2 at a prescribed angle relative to the optical axis L reflects off of the reflective wall 173Kd2 and then continues towards the side extension 171K. In this way, of the light emitted from the LED 20Kb, a portion of the light that travels towards the reflective wall 173Kd2 reflects off of that reflective wall 173Kd2 and is supplied to the side extension 171K.

Furthermore, as illustrated in FIG. 15, the light-receiving portion 173K also includes a side light-receiving portion 173Ke that faces and receives light from an LED 20Kd arranged second from the right end of the LED row 22K of the LED unit LUK. The LED 20Kd is a light source for supplying light to the right side extension 172K and will in some cases be referred to as a "side light source" (or "side LED").

The side light-receiving portion 173Ke is a protrusion-shaped structure that protrudes out from the end (the one end) 170Ka of the main body 170K towards the LED 20Kd (the side light source) and receives the light emitted from that LED 20Kd.

Moreover, the side light-receiving portion 173Ke is left-right symmetric to the side light-receiving portion 173Kd described above and has the same basic configuration as that side light-receiving portion 173Kd, and therefore a detailed description will be omitted here. A portion LK14 of the light emitted from the LED 20Kd reflects off of a reflective wall 173Ke2 and is supplied towards the side extension 172K.

The optical axes L of the LEDs 20K (20Ka, 20Kb, 20Kc, 20Kd, and 20Ke) of the LED unit LUK are all arranged so as to be positioned within the main body 170K.

In the present embodiment, the two reflective walls 173Kb2 and 173Kd2 are used to supply light to the left side extension 171K, and the two reflective walls 173Kc2 and 173Ke2 are used to supply light to the right side extension 172K. Furthermore, appropriately setting the angles of the reflective walls 173Kb2, 173Kd2, 173Kc2, and 173Ke2 (that is, the angles relative to the optical axes L) makes it possible to supply light to the side extensions 171K and 172K. As described here, light may be supplied to the side extensions 171K and 172K using a plurality of reflective walls or the like.

In the illumination device according to the present embodiment, the reflective walls 173Kb2, 173Kd2, 173Kc2, and 173Ke2 function as a supply unit that supplies light emitted from the LEDs 20Ka, 20Kb, 20Kd, and 20Ke (the side light sources) to the side extensions 171K and 172K. Including such a supply unit makes it possible to also supply light to the side extensions 171K and 172K of the light guide plate 17K, thereby preventing the light that exits from the front sides of the side extensions 171K and 172K from being relatively darker than the light that exits from the front side of the main body 170K. Therefore, the illumination device according to the present embodiment makes it possible to prevent irregularities in brightness in the light emitted from a light-exiting portion 17Ka of the light guide plate 17K.

Embodiment 13

Next, Embodiment 13 of the present invention will be described with reference to FIG. 16. In the present embodiment, a light guide plate 17L and an LED row (light source row) 22L used in an illumination device will be described. The description of the present embodiment will focus in particular on a light-receiving portion 173L of the light guide plate 17L.

Figure 16:
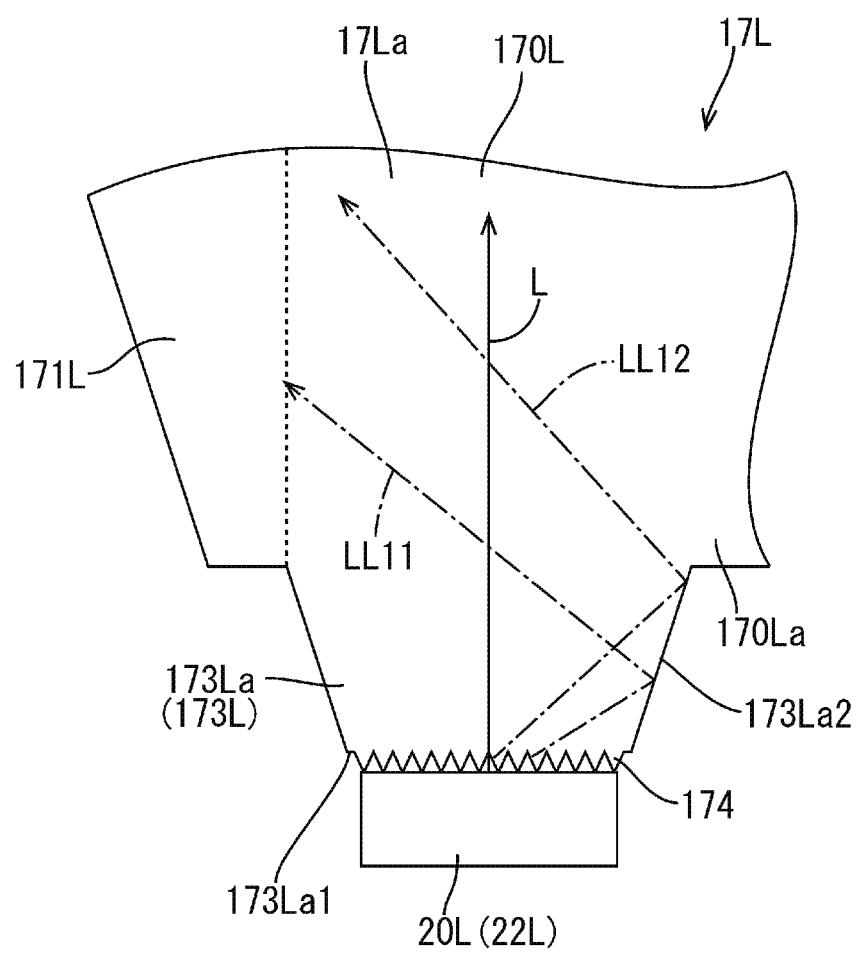
FIG. 16 is an enlarged plan view of a light-receiving portion of a light guide plate used in an illumination device according to Embodiment 13.

FIG. 16 is an enlarged plan view of the light-receiving portion 173L of the light guide plate 17L used in the illumination device according to Embodiment 13. Except for the light-receiving portion 173L, the light guide plate 17L of the present embodiment has the same basic configuration as in the embodiments such as Embodiment 12 described above. A plurality of the light-receiving portions 173L are formed on a near side end 170La of the main body 170L of the light guide plate 17L. FIG. 16 illustrates a side light-receiving portion 173La for supplying light to a side extension 171L of the main body 170L.

The side light-receiving portion 173La has a protrusion shape that protrudes out from the end 170La of the main body 170L towards an LED 20L in the LED row 22L. The side light-receiving portion 173La has a left-right symmetric trapezoidal (inverted trapezoidal) shape.

The LED 20L is a light source for supplying light to the left side extension 171L and corresponds to a side light source (side LED).

The side light-receiving portion 173La faces the LED 20L (the side light source) and includes a light-receiving end face 173a1 that allows light from the LED 20L to enter as well as a reflective wall 173La2 that is constituted by a portion of the peripheral wall surrounding the light-receiving end face 173a1 and that reflects or scatters the light that enters the light-receiving end face 173a1 in order to supply light towards the side extension 171L.

Although the light-receiving end face 173La1 has an overall plane shape that faces the light-emitting face of the LED 20L, a knurled portion 174 that includes a plurality of regularly arranged protrusions and recesses is formed in the surface of the light-receiving end face 173La1. As illustrated in FIG. 16, the reflective wall 173La2 is arranged on the side of the peripheral wall of the side light-receiving portion 173La that is farther away from the side extension 171L (that is, on the center LED side). The reflective wall 173La2 is angled in a direction that goes away from the direction of the optical axis L of the LED 20L (the Y axis direction).

When the light emitted from the LED 20L enters the side light-receiving portion 173La via the light-receiving end face 173La1, that light is reflected or scattered by the knurled portion 174 formed in the light-receiving end face 173La1. Therefore, the light that enters via the light-receiving end face 173La1 travels towards the reflective wall 173La2 at various angles and then reflects off of the reflective wall 173La2 and proceeds towards the side extension 171L as light LL11 and LL12.

As described here, a knurled portion 174 may be formed in the light-receiving end face 173La1 of the side light-receiving portion 173La. Moreover, the knurled portion 174 may be formed using a conventional knurling process.

In the present embodiment, the supply unit is constituted by the light-receiving end face 173La1 in which the knurled portion 174 is formed and the reflective wall 173La2.

Embodiment 14

Next, Embodiment 14 of the present invention will be described with reference to FIG. 17. In the present embodiment, a light guide plate 17M and an LED row (light source row) 22M used in an illumination device will be described. The description of the present embodiment will focus in particular on a light-receiving portion 173M of the light guide plate 17M.

Figure 17:
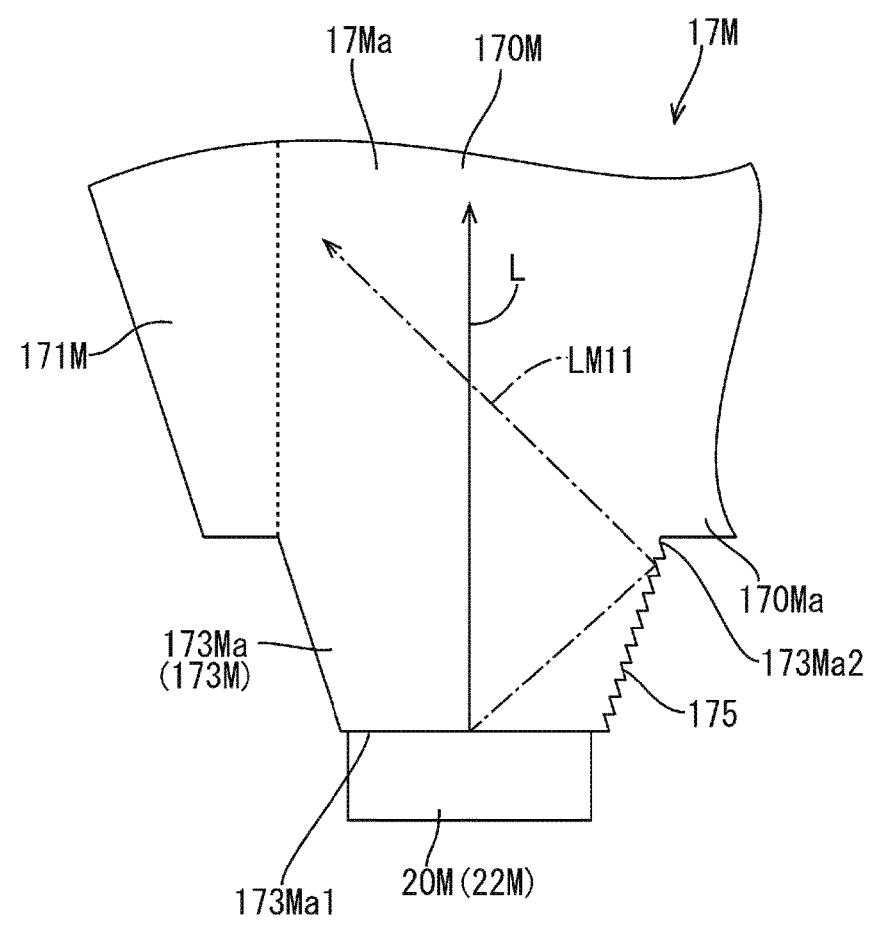
FIG. 17 is an enlarged plan view of a light-receiving portion of a light guide plate used in an illumination device according to Embodiment 14.

FIG. 17 is an enlarged plan view of the light-receiving portion 173M of the light guide plate 17M used in the illumination device according to Embodiment 14. Except for the light-receiving portion 173M, the light guide plate 17M of the present embodiment has the same basic configuration as in the embodiments such as Embodiment 13 described above. A plurality of the light-receiving portions 173M are formed on a near side end 170Ma of the main body 170M of the light guide plate 17M. FIG. 17 illustrates a side light-receiving portion 173Ma for supplying light to a side extension 171M of the main body 170M.

The side light-receiving portion 173Ma has a protrusion shape that protrudes out from the end 170Ma of the main body 170M towards an LED 20M in the LED row 22M. The side light-receiving portion 173Ma has a left-right symmetric trapezoidal (inverted trapezoidal) shape.

The LED 20M is a light source for supplying light to the left side extension 171M and corresponds to a side light source (side LED).

The side light-receiving portion 173Ma faces the LED 20M (the side light source) and includes a light-receiving end face 173Ma1 that allows light from the LED 20M to enter as well as a reflective wall 173Ma2 that is constituted by a portion of the peripheral wall surrounding the light-receiving end face 173Ma1 and that reflects or scatters the light that enters the light-receiving end face 173Ma1 in order to supply light towards the side extension 171M.

The light-receiving end face 173Ma1 has a plane shape that faces the light-emitting face of the LED 20M. As illustrated in FIG. 17, the reflective wall 173Ma2 is arranged on the side of the peripheral wall of the side light-receiving portion 173Ma that is farther away from the side extension 171M (that is, on the center LED side). The reflective wall 173Ma2 is angled in a direction that goes away from the direction of the optical axis L of the LED 20M (the Y axis direction). Furthermore, a knurled portion 175 that includes a plurality of regularly arranged protrusions and recesses is formed in the surface of the reflective wall 173Ma2. Note that the knurled portion 175 may be formed using a conventional knurling process.

The light emitted from the LED 20M enters the side light-receiving portion 173Ma via the light-receiving end face 173Ma1. Moreover, a portion of the light that enters proceeds towards the reflective wall 173Ma2. As described above, the knurled portion 175 is formed in the reflective wall 173Ma2, and the light traveling towards the reflective wall 173Ma2 is reflected or scattered by the knurled portion 175 and proceeds towards the side extension 171M as light LM11.

As described here, a knurled portion 175 may be formed in the reflective wall 173Ma2 of the side light-receiving portion 173Ma.

Moreover, in the present embodiment, the supply unit is constituted by the light-receiving end face 173Ma1 and the reflective wall 173Ma2 in which the knurled portion 175 is formed.

Embodiment 15

Next, Embodiment 15 of the present invention will be described with reference to FIG. 18. In the present embodiment, a light guide plate 17N and an LED row (light source row) 22N used in an illumination device will be described.

Figure 18:
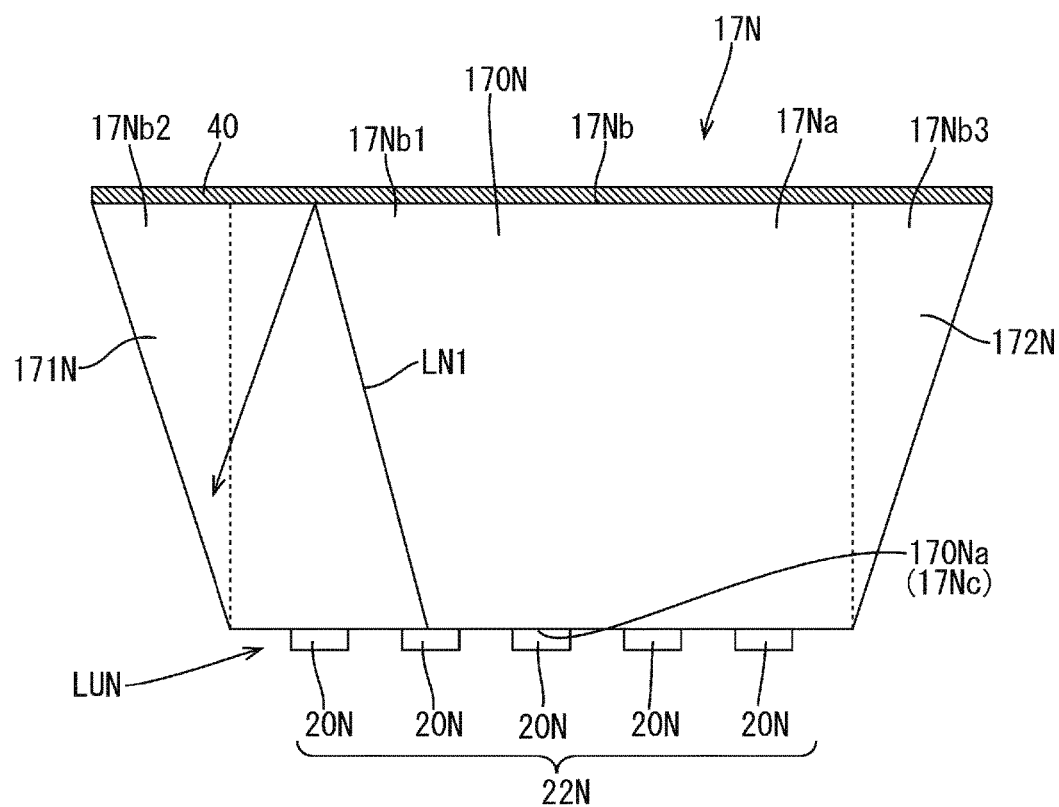
FIG. 18 is a plan view schematically illustrating a light guide plate and a row of LEDs used in an illumination device according to Embodiment 15.

FIG. 18 is a plan view schematically illustrating the light guide plate 17N and the LED row 22N used in the illumination device according to Embodiment 15. The light guide plate 17N has a left-right symmetric inverted trapezoidal shape when viewed in a plan view and includes a rectangular main body 170N, a triangular (inverted triangle-shaped) side extension 171N that is shown on the left side of FIG. 18, and a triangular (inverted triangle-shaped) side extension 172N that is shown on the right side of FIG. 18. The near side (LED unit LUN side) end 170Na of the main body 170N (the near side end 17Nc of the light guide plate 17N) has a flat plane shape that extends in the left-to-right direction (the X axis direction).

The end 170Na (the end 17Nc) functions as a light-receiving portion 170Na into which light from LEDs 20N in the LED row 22N enters.

The far side end 17Nb of the light guide plate 17N is arranged parallel to the near side end 17Nc and has a flat plane shape that extends in the left-to-right direction. The end 17Nb includes a far side end 17Nb2 of the left side extension 171N, a far side end 17Nb1 of the main body 170N, and a far side end 17Nb3 of the right side extension 172N.

Of the far side end 17Nb of the light guide plate 17N, the end 17Nb1 of the main body 170N faces the light-receiving portion 170Na. Meanwhile, the ends 17Nb2 and 17Nb3 of the side extensions 171N and 172N are arranged on the outer sides of the light-receiving portion 170Na and do not overlap with the light-receiving portion 170Na.

A metal film 40 is formed on the far side end 17Nb of the light guide plate 17N as a reflection/scattering portion. The metal film 40 is made of a metal such as aluminum or silver and is formed on the end 17Nb using a well-known process (such as chemical vapor deposition), for example. Once the metal film 40 has been formed on the end 17Nb, the light from the LEDs 20N (the light LN1 in FIG. 18, for example) is reflected (specularly reflected) by the metal film 40, and this reflected light is then supplied to the side extensions 171N and 172N.

Moreover, conditions such as the thickness of the metal film 40 and the region over which the metal film 40 is formed (the size of the metal film 40) are set as appropriate according to factors such as the amount of light that needs to be supplied to the side extensions 171N and 172N.

In the illumination device according to the present embodiment, the metal film 40 (the reflection/scattering portion) functions as a supply unit that supplies light to the side extensions 171N and 172N. Including such a supply unit makes it possible to also supply light to the side extensions 171N and 172N of the light guide plate 17N, thereby preventing the light that exits from the front sides of the side extensions 171N and 172N from being relatively darker than the light that exits from the front side of the main body 170N. Therefore, the illumination device according to the present embodiment makes it possible to prevent irregularities in brightness in the light emitted from a light-exiting portion 17Na of the light guide plate 17N.

Embodiment 16

Next, Embodiment 16 of the present invention will be described with reference to FIG. 19. In the present embodiment, a light guide plate 17O and an LED row (light source row) 22O used in an illumination device will be described.

Figure 19:
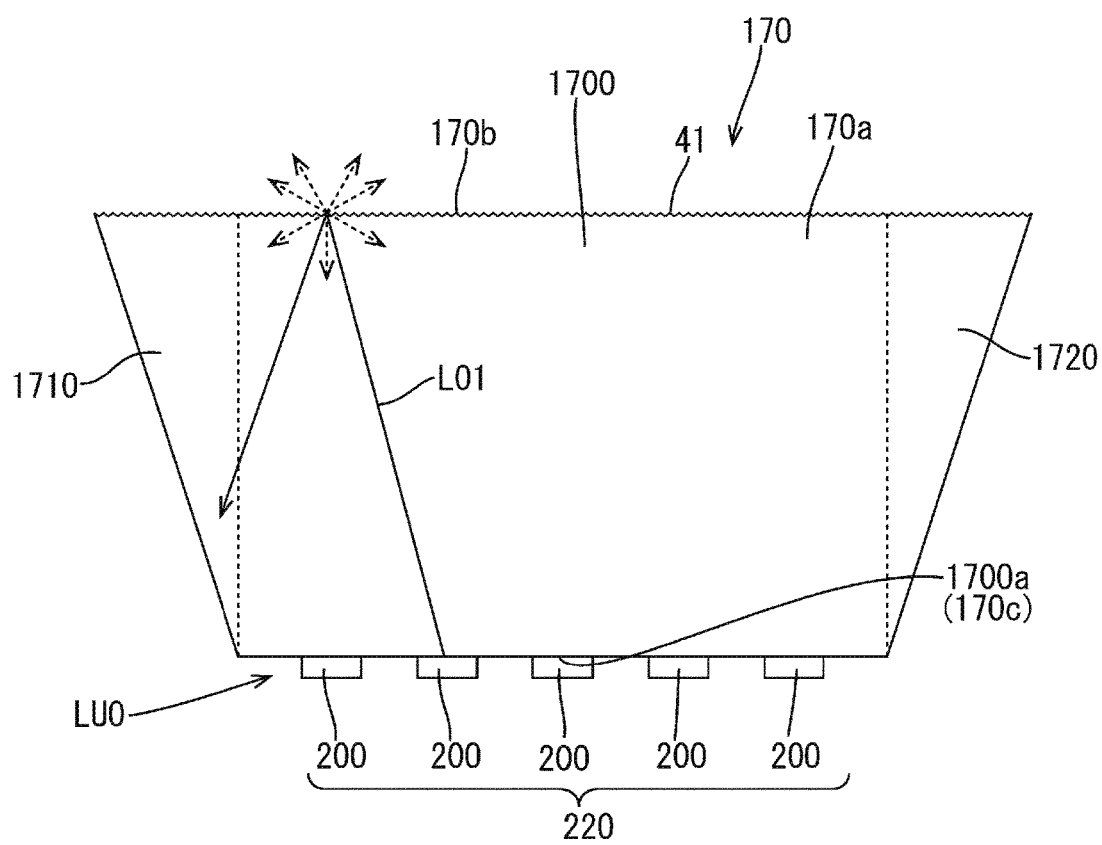
FIG. 19 is a plan view schematically illustrating a light guide plate and a row of LEDs used in an illumination device according to Embodiment 16.

FIG. 19 is a plan view schematically illustrating the light guide plate 17O and the LED row 22O used in the illumination device according to Embodiment 16. Similar to in Embodiment 15, the light guide plate 17O has a left-right symmetric inverted trapezoidal shape when viewed in a plan view and includes a main body 170O, a left side extension 171O, and a right side extension 172O. The near side (LED unit LUO side) end 170Oa of the main body 170O (that is, the near side end 17Oc of the light guide plate 17O) functions as a light-receiving portion 170Oa into which light from LEDs 20O in the LED row 22O enters.

A rough surface 41 is formed on the far side end 17Ob of the light guide plate 17O as a reflection/scattering portion. The rough surface 41 includes protrusions and recesses that are smaller than those that would be created by knurling. The rough surface 41 is formed by applying a conventional surface roughening process (such as a blasting process or a plasma treatment) to the end 17Ob of the light guide plate 17O. Once the rough surface 41 has been formed on the end 17Ob, the light from the LEDs 20O (the light LO1 in FIG. 19, for example) is reflected or scattered by the rough surface 41, and this reflected or scattered light is then supplied to the side extensions 171O and 172O.

Moreover, conditions such as the surface roughness of the rough surface 41 and the region over which the rough surface 41 is formed are set as appropriate according to factors such as the amount of light that needs to be supplied to the side extensions 171O and 172O.

In the illumination device according to the present embodiment, the rough surface 41 (the reflection/scattering portion) functions as a supply unit that supplies light to the side extensions 171O and 172O. Including such a supply unit makes it possible to also supply light to the side extensions 171O and 172O of the light guide plate 17O, thereby preventing the light that exits from the front sides of the side extensions 171O and 172O from being relatively darker than the light that exits from the front side of the main body 170O. Therefore, the illumination device according to the present embodiment makes it possible to prevent irregularities in brightness in the light emitted from a light-exiting portion 17Oa of the light guide plate 17O.

Embodiment 17

Next, Embodiment 17 of the present invention will be described with reference to FIG. 20. In the present embodiment, a light guide plate 17P and an LED row (light source row) 22P used in an illumination device will be described.

Figure 20:
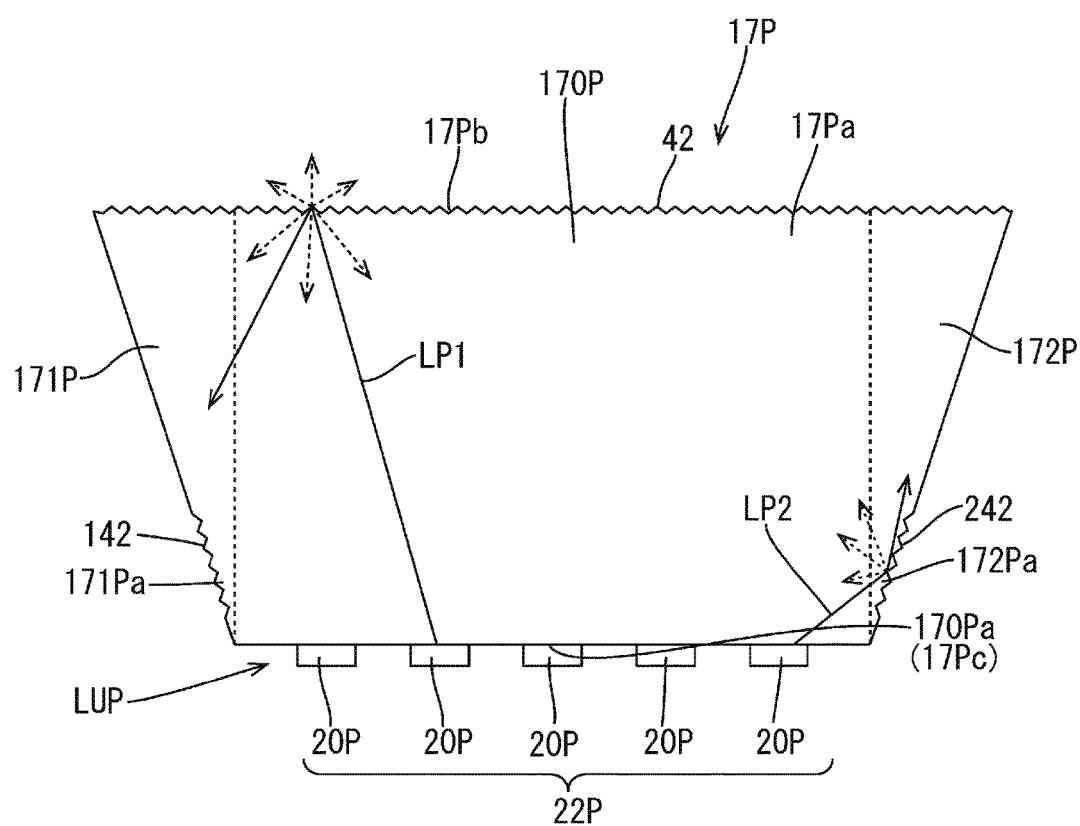
FIG. 20 is a plan view schematically illustrating a light guide plate and a row of LEDs used in an illumination device according to Embodiment 17.

FIG. 20 is a plan view schematically illustrating the light guide plate 17P and the LED row 22P used in the illumination device according to Embodiment 17. Similar to in the embodiments such as Embodiment 15 described above, the light guide plate 17P has a left-right symmetric inverted trapezoidal shape when viewed in a plan view and includes a main body 170P, a left side extension 171P, and a right side extension 172P. The near side (LED unit LUP side) end 170Pa of the main body 170P (that is, the near side end 17Pc of the light guide plate 17P) functions as a light-receiving portion 170Pa into which light from LEDs 20P in the LED row 22P enters.

A knurled portion 42 is formed on the far side end 17Pb of the light guide plate 17P as a reflection/scattering portion. The knurled portion 42 is a machined surface that includes regularly arranged protrusions and recesses. The knurled portion 42 is formed by applying a conventional knurling process to the end 17Pb of the light guide plate 17P. Once the knurled portion 42 has been formed on the end 17Pb, the light from the LEDs 20P (the light LP1 in FIG. 20, for example) is reflected or scattered by the knurled portion 42, and this reflected or scattered light is then supplied to the side extensions 171P and 172P.

Moreover, conditions such as the protrusion/recess pattern of the knurled portion 42 and the region over which the knurled portion 42 is formed are set as appropriate according to factors such as the amount of light that needs to be supplied to the side extensions 171P and 172P.

Furthermore, similar knurled portions 142 and 242 are respectively formed in both side edges 171Pa and 172Pa of the light guide plate 17P. Light may also be supplied to the side extensions 171P and 172P by forming these types of knurled portions 142 and 242 in the side edges 171Pa and 172Pa of the light guide plate 17P.

In the illumination device according to the present embodiment, the knurled portion 42 (the reflection/scattering portion) functions as a supply unit that supplies light to the side extensions 171P and 172P. Furthermore, the knurled portions 142 and 242 (the reflection/scattering portions) also function as a supply unit that supplies light to the side extensions 171P and 172P. Including such supply units makes it possible to also supply light to the side extensions 171P and 172P of the light guide plate 17P, thereby preventing the light that exits from the front sides of the side extensions 171P and 172P from being relatively darker than the light that exits from the front side of the main body 170P. Therefore, the illumination device according to the present embodiment makes it possible to prevent irregularities in brightness in the light emitted from a light-exiting portion 17Pa of the light guide plate 17P.

Embodiment 18

Next, Embodiment 18 of the present invention will be described with reference to FIG. 21. In the present embodiment, a light guide plate 17Q and an LED row (light source row) 22Q used in an illumination device will be described.

Figure 21:
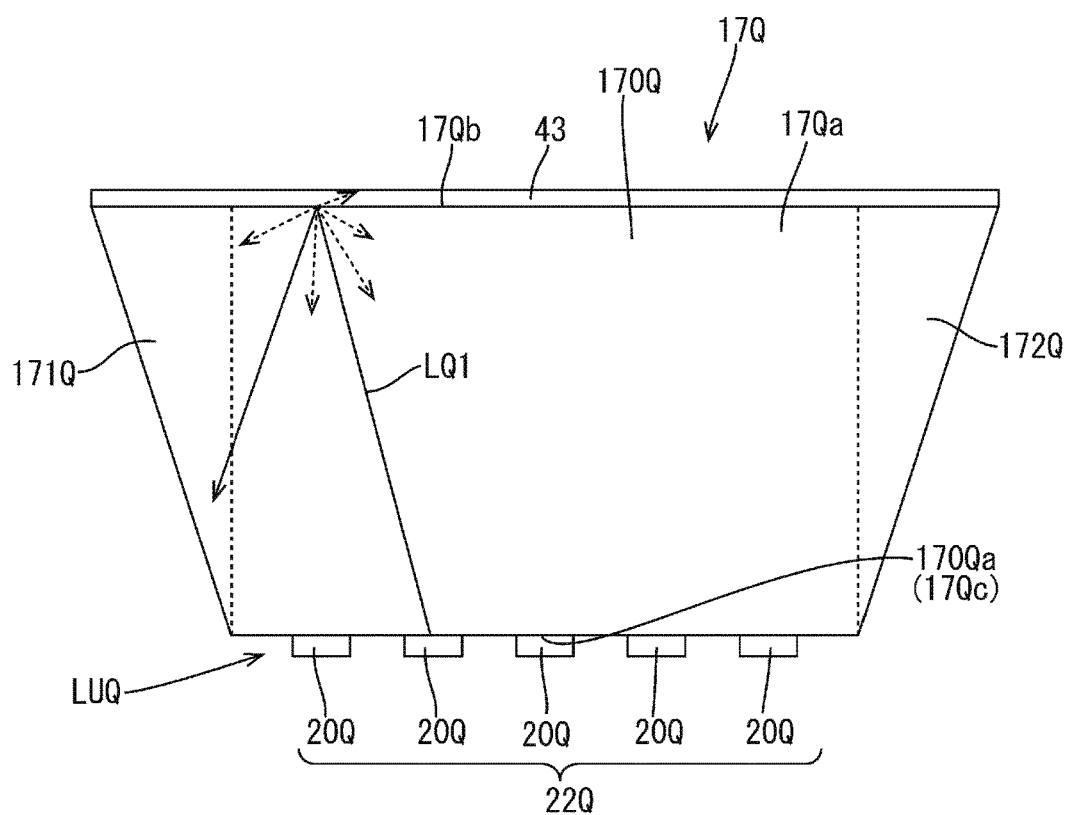
FIG. 21 is a plan view schematically illustrating a light guide plate and a row of LEDs used in an illumination device according to Embodiment 18.

FIG. 21 is a plan view schematically illustrating the light guide plate 17Q and the LED row 22Q used in the illumination device according to Embodiment 18. Similar to in the embodiments such as Embodiment 15 described above, the light guide plate 17Q has a left-right symmetric inverted trapezoidal shape when viewed in a plan view and includes a main body 170Q, a left side extension 171Q, and a right side extension 172Q. The near side (LED unit LUQ side) end 170Qa of the main body 170Q (that is, the near side end 17Qc of the light guide plate 17Q) functions as a light-receiving portion 170Qa into which light from LEDs 20Q in the LED row 22Q enters.

A white tape (an example of a reflective/scattering tape) 43 is formed on the far side end 17Qb of the light guide plate 17Q as a reflection/scattering portion. The white tape 43 is formed by applying a layer of an adhesive to one side of a base material sheet made of a white plastic. Once the white tape 43 has been applied to the end 17Qb, the light from the LEDs 20Q (the light LQ1 in FIG. 21, for example) is reflected or scattered (Lambertian scattering) by the white tape 43, and this reflected or scattered light is then supplied to the side extensions 171Q and 172Q.

Moreover, conditions such as the region over which the white tape 43 is formed are set as appropriate according to factors such as the amount of light that needs to be supplied to the side extensions 171Q and 172Q.

In the illumination device according to the present embodiment, the white tape 43 (the reflection/scattering portion) functions as a supply unit that supplies light to the side extensions 171Q and 172Q. Including such a supply unit makes it possible to also supply light to the side extensions 171Q and 172Q of the light guide plate 17Q, thereby preventing the light that exits from the front sides of the side extensions 171Q and 172Q from being relatively darker than the light that exits from the front side of the main body 170Q. Therefore, the illumination device according to the present embodiment makes it possible to prevent irregularities in brightness in the light emitted from a light-exiting portion 17Qa of the light guide plate 17Q.

Embodiment 19

Next, Embodiment 19 of the present invention will be described with reference to FIG. 22. In the present embodiment, a light guide plate 17R and an LED row (light source row) 22R used in an illumination device will be described.

Figure 22:
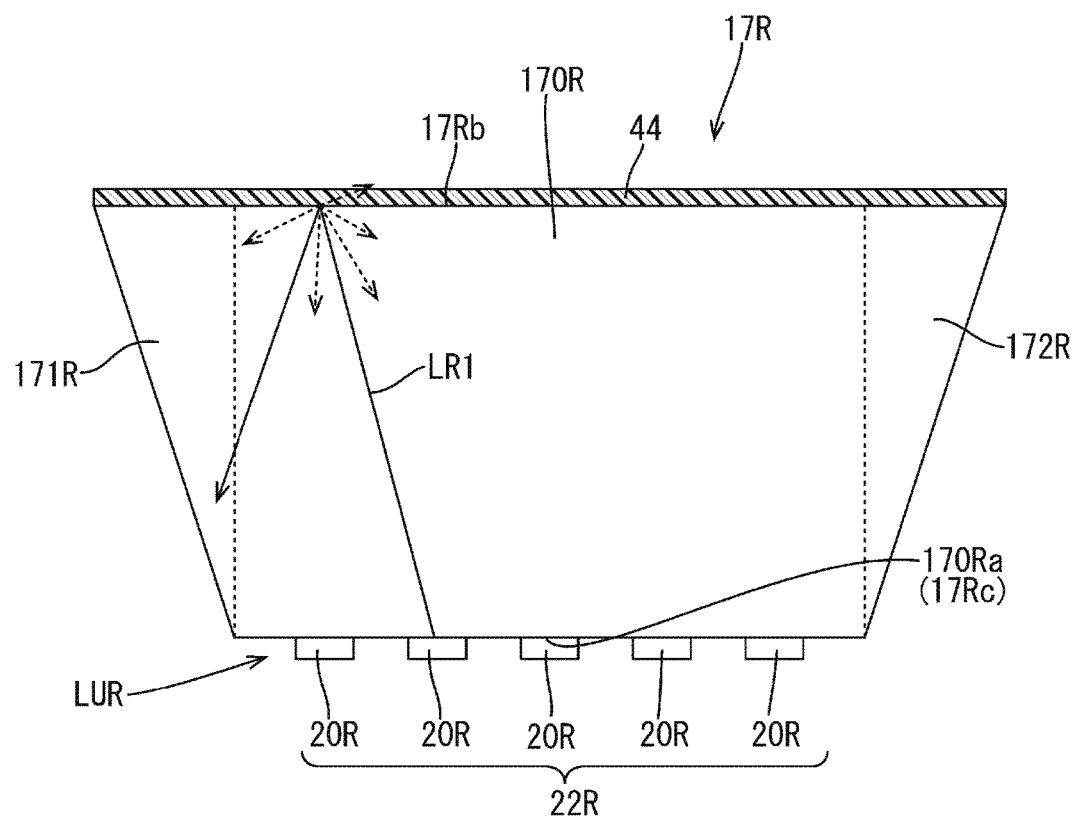
FIG. 22 is a plan view schematically illustrating a light guide plate and a row of LEDs used in an illumination device according to Embodiment 19.

FIG. 22 is a plan view schematically illustrating the light guide plate 17R and the LED row 22R used in the illumination device according to Embodiment 19. Similar to in the embodiments such as Embodiment 15 described above, the light guide plate 17R has a left-right symmetric inverted trapezoidal shape when viewed in a plan view and includes a main body 170R, a left side extension 171R, and a right side extension 172R. The near side (LED unit LUR side) end 170Ra of the main body 170R (that is, the near side end 17Rc of the light guide plate 17R) functions as a light-receiving portion 170Ra into which light from LEDs 20R in the LED row 22R enters.

A white resin layer 44 is formed on the far side end 17Rb of the light guide plate 17R as a reflection/scattering portion. The white resin layer 44 is prepared by dispersing a white pigment such as titanium oxide in an adhesive matrix resin (such as an acrylic resin). This white resin layer 44 is then formed on the end 17Rb using a method such as insert molding or two-color molding. Once the white resin layer 44 has been formed on the end 17Rb, the light from the LEDs 20R (the light LR1 in FIG. 22, for example) is reflected or scattered (Lambertian scattering) by the white resin layer 44, and this reflected or scattered light is then supplied to the side extensions 171R and 172R.

Moreover, conditions such as the thickness of the white resin layer 44 and the region over which the white resin layer 44 is formed are set as appropriate according to factors such as the amount of light that needs to be supplied to the side extensions 171R and 172R. In addition, the white resin layer 44 may also be formed on the end 17Rb as a coating in the other embodiments.

In the illumination device according to the present embodiment, the white resin layer 44 (the reflection/scattering portion) functions as a supply unit that supplies light to the side extensions 171R and 172R. Including such a supply unit makes it possible to also supply light to the side extensions 171R and 172R of the light guide plate 17R, thereby preventing the light that exits from the front sides of the side extensions 171R and 172R from being relatively darker than the light that exits from the front side of the main body 170R. Therefore, the illumination device according to the present embodiment makes it possible to prevent irregularities in brightness in the light emitted from a light-exiting portion of the light guide plate 17R.

Embodiment 20

Next, Embodiment 20 of the present invention will be described with reference to FIG. 23. In the present embodiment, a light guide plate 17S and an LED row (light source row) 22S used in an illumination device will be described.

Figure 23:
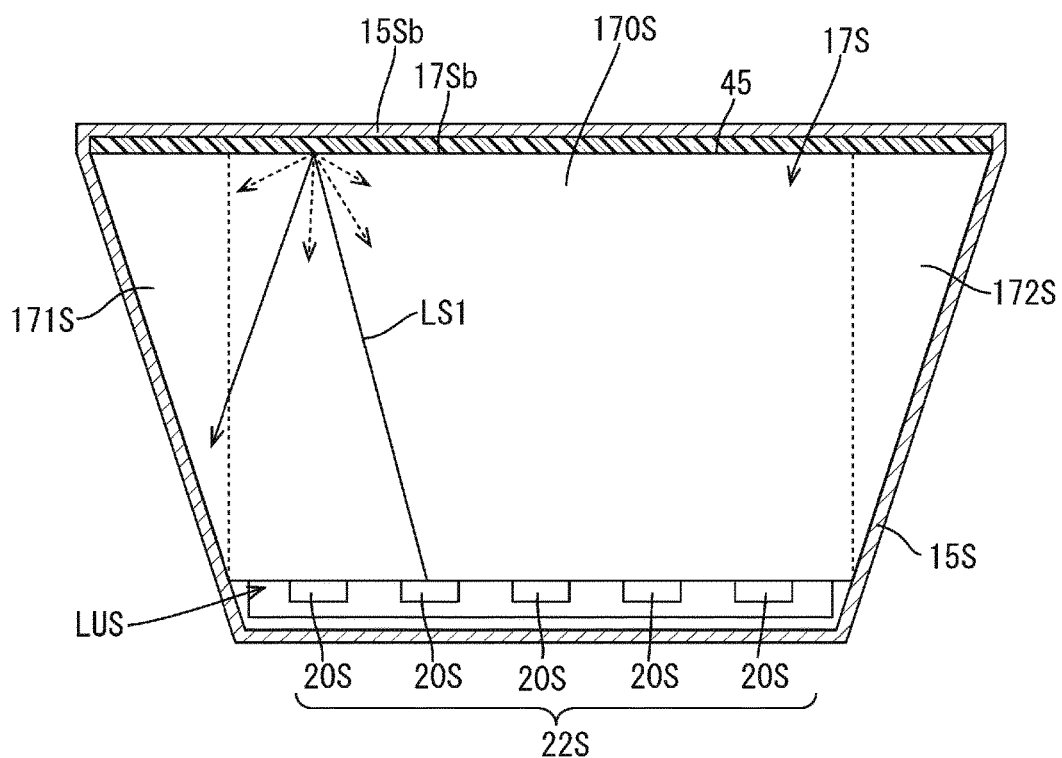
FIG. 23 is a plan view schematically illustrating a light guide plate and a row of LEDs used in an illumination device according to Embodiment 20.
Figure 23:
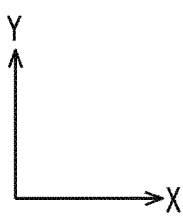

FIG. 23 is a plan view schematically illustrating the light guide plate 17S and the LED row 22S used in the illumination device according to Embodiment 20. Also note that in FIG. 23, an LED unit LUS that includes the light guide plate 17S and the LED row 22S is illustrated as being housed within a housing 15S.

Similar to in the embodiments such as Embodiment 15 described above, the light guide plate 17S has a left-right symmetric inverted trapezoidal shape when viewed in a plan view and includes a main body 170S, a left side extension 171S, and a right side extension 172S. The near side (LED unit LUS side) end of the main body 170S (that is, the near side end of the light guide plate 17S) functions as a light-receiving portion into which light from LEDs 20S in the LED row 22S enters.

Unlike in Embodiment 19 as described above, no reflection/scattering portion is formed on the far side end 17Sb of the light guide plate 17S. However, a white resin layer 45 is formed as a reflection/scattering portion on a peripheral wall 15Sb of the housing 15S that faces the end 17Sb. The white resin layer 45 is formed on the inner side of the peripheral wall 15Sb so as to cover the end 17Sb. The composition of the white resin layer 45 is the same as that of the white resin layer in Embodiment 19. Moreover, the white resin layer 45 may be formed as part of the housing 15S using a method such as insert molding or two-color molding or may be formed on the peripheral wall 15Sb as a film.

Once the white resin layer 45 has been formed on the peripheral wall 15Sb so as to cover the end 17Sb, the light from the LEDs 20S (the light LS1 in FIG. 22, for example) is reflected or scattered (Lambertian scattering) by the white resin layer 45, and this reflected or scattered light is then supplied to the side extensions 171S and 172S.

Conditions such as the thickness of the white resin layer 45 and the region over which the white resin layer 45 is formed are set as appropriate according to factors such as the amount of light that needs to be supplied to the side extensions 171S and 172S. This type of white resin layer 45 can be used in cases such as when a reflection/scattering portion cannot be formed directly on the end 17Sb due to reasons such as the light guide plate 17S being too thin, for example.

In the illumination device according to the present embodiment, the white resin layer 45 that is formed as a reflection/scattering portion on the peripheral wall 15Sb functions as a supply unit that supplies light to the side extensions 171S and 172S. Including such a supply unit makes it possible to also supply light to the side extensions 171S and 172S of the light guide plate 17S, thereby preventing the light that exits from the front sides of the side extensions 171S and 172S from being relatively darker than the light that exits from the front side of the main body 170S. Therefore, the illumination device according to the present embodiment makes it possible to prevent irregularities in brightness in the light emitted from a light-exiting portion of the light guide plate 17S.

Other Embodiments

The present invention is not limited to the embodiments as presented in the descriptions and figures above, and embodiments such as the following are also included in the technical scope of the present invention.

(1) In the embodiments described above, LEDs were used as the light source as an example. However, in another embodiment, another light source may be used as long as the effects of the present invention can still be achieved.

(2) In the embodiments described above, a liquid crystal display device that includes a liquid crystal panel as the display panel was used as an example. However, in another embodiment, another type of display panel that requires an illumination device may be used as long as the effects of the present invention can still be achieved.

(3) In the embodiments described above, the light guide plate was configured to include side extensions respectively arranged on both sides of a main body (one on each side). However, in another embodiment, the light guide plate may be configured to include a side extension arranged just on one side.

DESCRIPTION OF REFERENCE CHARACTERS 10 liquid crystal display device (display device)
11 liquid crystal panel (display panel)
12 touch panel
13 cover panel
14 illumination device (backlight)
15 housing
16 optical sheet
17 light guide plate
18 reflective sheet
20 LED (light source)
21 LED substrate
22 LED row (light source row)
LU LED unit (light source unit)
R display region
20a, 20e, 170a2, 170a3 supply unit
L optical axis

What is claimed is:

1. An illumination device, comprising:
a light source row in which a plurality of light sources are aligned in a first direction in a row;
a light guide plate including a plate-shaped main body with an end thereof facing the light source row, a light-receiving portion arranged on the end of the main body and into which light from the light sources enters, a plate-shaped side extension arranged on each of left and right sides of the main body and extending outwards further than the light-receiving portion, and a light-exiting portion arranged on front surfaces of the main body and the side extensions and allowing light entering via the light-receiving portion to exit; and
a supply unit supplying light to the side extension,
wherein in at least one of the side extensions, a width in the first direction of at least a portion of the side extension corresponding to the light existing portion increases monotonically from a side of said end that faces the light source row towards an opposite side that is opposite to the side of said end,
wherein at least one of a through hole and a cutout is formed spanning between the main body and the side extensions, and
wherein an optical axis of any one of the plurality of light sources crosses through the at least one of the through hole and the cutout.

2. The illumination device according to claim 1,
wherein the light-receiving portion includes a main body light-receiving portion for allowing light to enter the main body and a side light-receiving portion arranged further outwards than the main body light-receiving portion and allowing light to enter the side extension,
wherein the light source row includes a center light source arranged towards a center side of the plurality of light sources such that an optical axis of the center light source is positioned within the main body, and a side light source arranged on an outer side of the center light source such that an optical axis of the side light source is positioned within the side extension, and
wherein the supply unit comprises the side light-receiving portion and the side light source.

3. The illumination device according to claim 1,
wherein the illumination device includes a secondary light source arranged facing an outer end of one of the side extensions and supplies light that horizontally crosses the main body towards another of the side extensions, and
wherein the supply unit comprises the secondary light source.

* * * * *